(12) United States Patent
Boutros et al.

(10) Patent No.: US 12,250,194 B2
(45) Date of Patent: Mar. 11, 2025

(54) FACILITATING DISTRIBUTED SNAT SERVICE

(71) Applicant: VMware LLC, Palo Alto, CA (US)

(72) Inventors: Sami Boutros, Union City, CA (US);
Mani Kancherla, Cupertino, CA (US);
Jayant Jain, Cupertino, CA (US);
Anirban Sengupta, Saratoga, CA (US)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 18/102,697

(22) Filed: Jan. 28, 2023

(65) Prior Publication Data
US 2023/0179564 A1    Jun. 8, 2023

Related U.S. Application Data

(63) Continuation of application No. 16/931,196, filed on Jul. 16, 2020, now Pat. No. 11,616,755.

(51) Int. Cl.
*H04L 61/256* (2022.01)
*H04L 12/66* (2006.01)
(Continued)

(52) U.S. Cl.
CPC ............ *H04L 61/256* (2013.01); *H04L 12/66* (2013.01); *H04L 45/745* (2013.01);
(Continued)

(58) Field of Classification Search
CPC ... H04L 61/256; H04L 61/5007; H04L 12/66; H04L 45/745; H04L 61/2592; H04L 2101/659
See application file for complete search history.

(56) References Cited

U.S. PATENT DOCUMENTS

| 5,504,921 A | 4/1996 | Dev et al. |
| 5,550,816 A | 8/1996 | Hardwick et al. |
| (Continued) | | |

FOREIGN PATENT DOCUMENTS

| EP | 1653688 A1 | 5/2006 |
| EP | 2882151 A1 | 6/2015 |
| (Continued) | | |

OTHER PUBLICATIONS

Borella, Michael, et al., "Distributed Network Address Translation," Oct. 1998, 24 pages, 3Com Corp.
(Continued)

*Primary Examiner* — Oleg Survillo
*Assistant Examiner* — Monishwar Mohan
(74) *Attorney, Agent, or Firm* — Quarles & Brady LLP

(57) ABSTRACT

Some embodiments of the invention provide novel methods for facilitating a distributed SNAT (dSNAT) middlebox service operation for a first network at a host computer in the first network on which the dSNAT middlebox service operation is performed and a gateway device between the first network and a second network. The novel methods enable dSNAT that provides stateful SNAT at multiple host computers, thus avoiding the bottleneck problem associated with providing stateful SNAT at gateways and also significantly reduces the need to redirect packets received at the wrong host by using a capacity of off-the-shelf gateway devices to perform IPV6 encapsulation for IPv4 packets and assigning locally unique IPv6 addresses to each host executing a dSNAT middlebox service instance that are used by the gateway device.

20 Claims, 15 Drawing Sheets

(51) Int. Cl.
*H04L 45/745* (2022.01)
*H04L 61/2592* (2022.01)
*H04L 61/5007* (2022.01)
*H04L 101/659* (2022.01)

(52) U.S. Cl.
CPC ...... *H04L 61/2592* (2013.01); *H04L 61/5007* (2022.05); *H04L 2101/659* (2022.05)

(56) References Cited

U.S. PATENT DOCUMENTS

| | | |
|---|---|---|
| 5,751,967 A | 5/1998 | Raab et al. |
| 6,006,275 A | 12/1999 | Picazo et al. |
| 6,104,699 A | 8/2000 | Holender et al. |
| 6,219,699 B1 | 4/2001 | McCloghrie et al. |
| 6,359,909 B1 | 3/2002 | Ito et al. |
| 6,456,624 B1 | 9/2002 | Eccles et al. |
| 6,512,745 B1 | 1/2003 | Abe et al. |
| 6,539,432 B1 | 3/2003 | Taguchi et al. |
| 6,680,934 B1 | 1/2004 | Cain |
| 6,785,843 B1 | 8/2004 | McRae et al. |
| 6,941,487 B1 | 9/2005 | Balakrishnan et al. |
| 6,950,428 B1 | 9/2005 | Horst et al. |
| 6,963,585 B1 | 11/2005 | Pennec et al. |
| 6,999,454 B1 | 2/2006 | Crump |
| 7,046,630 B2 | 5/2006 | Abe et al. |
| 7,197,572 B2 | 3/2007 | Matters et al. |
| 7,200,144 B2 | 4/2007 | Terrell et al. |
| 7,209,439 B2 | 4/2007 | Rawlins et al. |
| 7,260,648 B2 | 8/2007 | Tingley et al. |
| 7,283,473 B2 | 10/2007 | Arndt et al. |
| 7,302,484 B1 | 11/2007 | Stapp et al. |
| 7,342,916 B2 | 3/2008 | Das et al. |
| 7,391,771 B2 | 6/2008 | Orava et al. |
| 7,450,598 B2 | 11/2008 | Chen et al. |
| 7,463,579 B2 | 12/2008 | Lapuh et al. |
| 7,478,173 B1 | 1/2009 | Delco |
| 7,483,411 B2 | 1/2009 | Weinstein et al. |
| 7,555,002 B2 | 6/2009 | Arndt et al. |
| 7,606,260 B2 | 10/2009 | Oguchi et al. |
| 7,643,488 B2 | 1/2010 | Khanna et al. |
| 7,649,851 B2 | 1/2010 | Takashige et al. |
| 7,710,874 B2 | 5/2010 | Balakrishnan et al. |
| 7,764,599 B2 | 7/2010 | Doi et al. |
| 7,792,987 B1 | 9/2010 | Vohra et al. |
| 7,818,452 B2 | 10/2010 | Matthews et al. |
| 7,826,482 B1 | 11/2010 | Minei et al. |
| 7,839,847 B2 | 11/2010 | Nadeau et al. |
| 7,885,276 B1 | 2/2011 | Lin |
| 7,936,770 B1 | 5/2011 | Frattura et al. |
| 7,937,438 B1 | 5/2011 | Miller et al. |
| 7,948,986 B1 | 5/2011 | Ghosh et al. |
| 7,953,865 B1 | 5/2011 | Miller et al. |
| 7,991,859 B1 | 8/2011 | Miller et al. |
| 7,995,483 B1 | 8/2011 | Bayar et al. |
| 8,027,354 B1 | 9/2011 | Portolani et al. |
| 8,031,633 B2 | 10/2011 | Bueno et al. |
| 8,046,456 B1 | 10/2011 | Miller et al. |
| 8,054,832 B1 | 11/2011 | Shukla et al. |
| 8,055,789 B2 | 11/2011 | Richardson et al. |
| 8,060,875 B1 | 11/2011 | Lambeth |
| 8,131,852 B1 | 3/2012 | Miller et al. |
| 8,149,737 B2 | 4/2012 | Metke et al. |
| 8,155,028 B2 | 4/2012 | Abu-Hamdeh et al. |
| 8,166,201 B2 | 4/2012 | Richardson et al. |
| 8,194,674 B1 | 6/2012 | Pagel et al. |
| 8,199,750 B1 | 6/2012 | Schultz et al. |
| 8,223,668 B2 | 7/2012 | Allan et al. |
| 8,224,931 B1 | 7/2012 | Brandwine et al. |
| 8,224,971 B1 | 7/2012 | Miller et al. |
| 8,239,572 B1 | 8/2012 | Brandwine et al. |
| 8,259,571 B1 | 9/2012 | Raphel et al. |
| 8,265,075 B2 | 9/2012 | Pandey |
| 8,281,067 B2 | 10/2012 | Stolowitz |
| 8,312,129 B1 | 11/2012 | Miller et al. |
| 8,339,959 B1 | 12/2012 | Moisand et al. |
| 8,339,994 B2 | 12/2012 | Gnanasekaran et al. |
| 8,345,650 B2 | 1/2013 | Foxworthy et al. |
| 8,351,418 B2 | 1/2013 | Zhao et al. |
| 8,370,834 B2 | 2/2013 | Edwards et al. |
| 8,456,984 B2 | 6/2013 | Ranganathan et al. |
| 8,498,295 B1 * | 7/2013 | Saxena ................. H04L 12/56 370/522 |
| 8,504,718 B2 | 8/2013 | Wang et al. |
| 8,565,108 B1 | 10/2013 | Marshall et al. |
| 8,611,351 B2 | 12/2013 | Gooch et al. |
| 8,612,627 B1 | 12/2013 | Brandwine |
| 8,625,594 B2 | 1/2014 | Safrai et al. |
| 8,625,603 B1 | 1/2014 | Ramakrishnan et al. |
| 8,625,616 B2 | 1/2014 | Vobbilisetty et al. |
| 8,627,313 B2 | 1/2014 | Edwards et al. |
| 8,644,188 B1 | 2/2014 | Brandwine et al. |
| 8,660,129 B1 | 2/2014 | Brendel et al. |
| 8,705,513 B2 | 4/2014 | Merwe et al. |
| 8,958,298 B2 | 2/2015 | Zhang et al. |
| 9,059,999 B2 | 6/2015 | Koponen et al. |
| 9,258,272 B1 * | 2/2016 | Durand ................. H04L 63/30 |
| 10,063,458 B2 | 8/2018 | Zhang et al. |
| 10,212,071 B2 | 2/2019 | Kancherla et al. |
| 10,237,157 B1 | 3/2019 | Sears et al. |
| 10,491,466 B1 | 11/2019 | Hira et al. |
| 10,693,763 B2 | 6/2020 | Zhang et al. |
| 10,742,746 B2 | 8/2020 | Kancherla et al. |
| 10,826,827 B1 | 11/2020 | Natal et al. |
| 10,862,753 B2 | 12/2020 | Hira et al. |
| 11,087,409 B1 | 8/2021 | Bobley et al. |
| 11,095,480 B2 | 8/2021 | Natarajan et al. |
| 11,159,343 B2 | 10/2021 | Natarajan et al. |
| 11,451,413 B2 | 9/2022 | Boutros et al. |
| 11,606,294 B2 | 3/2023 | Boutros et al. |
| 11,611,613 B2 | 3/2023 | Jain et al. |
| 11,616,755 B2 | 3/2023 | Boutros et al. |
| 11,665,242 B2 | 5/2023 | Kancherla et al. |
| 2001/0043614 A1 | 11/2001 | Viswanadham et al. |
| 2002/0093952 A1 | 7/2002 | Gonda |
| 2002/0186705 A1 | 12/2002 | Kadambi et al. |
| 2002/0194369 A1 | 12/2002 | Rawlins et al. |
| 2003/0041170 A1 | 2/2003 | Suzuki |
| 2003/0058850 A1 | 3/2003 | Rangarajan et al. |
| 2003/0069972 A1 | 4/2003 | Yoshimura et al. |
| 2003/0179742 A1 | 9/2003 | Ogier et al. |
| 2003/0225857 A1 | 12/2003 | Flynn et al. |
| 2004/0073659 A1 | 4/2004 | Rajsic et al. |
| 2004/0098505 A1 | 5/2004 | Clemmensen |
| 2004/0267866 A1 | 12/2004 | Carollo et al. |
| 2005/0018669 A1 | 1/2005 | Arndt et al. |
| 2005/0027881 A1 | 2/2005 | Figueira et al. |
| 2005/0053079 A1 | 3/2005 | Havala |
| 2005/0083953 A1 | 4/2005 | May |
| 2005/0120160 A1 | 6/2005 | Plouffe et al. |
| 2005/0132044 A1 | 6/2005 | Guingo et al. |
| 2006/0002370 A1 | 1/2006 | Rabie et al. |
| 2006/0018253 A1 | 1/2006 | Windisch et al. |
| 2006/0026225 A1 | 2/2006 | Canali et al. |
| 2006/0029056 A1 | 2/2006 | Perera et al. |
| 2006/0056412 A1 | 3/2006 | Page |
| 2006/0092940 A1 | 5/2006 | Ansari et al. |
| 2006/0092976 A1 | 5/2006 | Lakshman et al. |
| 2006/0174087 A1 | 8/2006 | Hashimoto et al. |
| 2006/0187908 A1 | 8/2006 | Shimozono et al. |
| 2006/0193266 A1 | 8/2006 | Siddha et al. |
| 2006/0291388 A1 | 12/2006 | Amdahl et al. |
| 2007/0043860 A1 | 2/2007 | Pabari |
| 2007/0064673 A1 | 3/2007 | Bhandaru et al. |
| 2007/0140128 A1 | 6/2007 | Klinker et al. |
| 2007/0156919 A1 | 7/2007 | Potti et al. |
| 2007/0201357 A1 | 8/2007 | Smethurst et al. |
| 2007/0297428 A1 | 12/2007 | Bose et al. |
| 2008/0002579 A1 | 1/2008 | Lindholm et al. |
| 2008/0002683 A1 | 1/2008 | Droux et al. |
| 2008/0013474 A1 | 1/2008 | Nagarajan et al. |
| 2008/0049621 A1 | 2/2008 | McGuire et al. |
| 2008/0049646 A1 | 2/2008 | Lu |
| 2008/0059556 A1 | 3/2008 | Greenspan et al. |

(56) References Cited

U.S. PATENT DOCUMENTS

| | | |
|---|---|---|
| 2008/0071900 A1 | 3/2008 | Hecker et al. |
| 2008/0086726 A1 | 4/2008 | Griffith et al. |
| 2008/0151893 A1 | 6/2008 | Nordmark et al. |
| 2008/0159301 A1 | 7/2008 | Heer |
| 2008/0189769 A1 | 8/2008 | Casado et al. |
| 2008/0225853 A1 | 9/2008 | Melman et al. |
| 2008/0240122 A1 | 10/2008 | Richardson et al. |
| 2008/0253366 A1 | 10/2008 | Zuk et al. |
| 2008/0263205 A1 | 10/2008 | Naseh |
| 2008/0291910 A1 | 11/2008 | Tadimeti et al. |
| 2009/0031041 A1 | 1/2009 | Clemmensen |
| 2009/0043823 A1 | 2/2009 | Iftode et al. |
| 2009/0083445 A1 | 3/2009 | Ganga |
| 2009/0092137 A1 | 4/2009 | Haigh et al. |
| 2009/0122710 A1 | 5/2009 | Bar-Tor et al. |
| 2009/0150527 A1 | 6/2009 | Tripathi et al. |
| 2009/0161547 A1 | 6/2009 | Riddle et al. |
| 2009/0249470 A1 | 10/2009 | Litvin et al. |
| 2009/0249473 A1 | 10/2009 | Cohn |
| 2009/0279536 A1 | 11/2009 | Unbehagen et al. |
| 2009/0292858 A1 | 11/2009 | Lambeth et al. |
| 2009/0300210 A1 | 12/2009 | Ferris |
| 2009/0303880 A1 | 12/2009 | Maltz et al. |
| 2010/0002722 A1 | 1/2010 | Porat et al. |
| 2010/0046531 A1 | 2/2010 | Louati et al. |
| 2010/0107162 A1 | 4/2010 | Edwards et al. |
| 2010/0115101 A1 | 5/2010 | Lain et al. |
| 2010/0131636 A1 | 5/2010 | Suri et al. |
| 2010/0153554 A1 | 6/2010 | Anschutz et al. |
| 2010/0153701 A1 | 6/2010 | Shenoy et al. |
| 2010/0162036 A1 | 6/2010 | Linden et al. |
| 2010/0165877 A1 | 7/2010 | Shukla et al. |
| 2010/0169467 A1 | 7/2010 | Shukla et al. |
| 2010/0175125 A1 | 7/2010 | McDysan |
| 2010/0192225 A1 | 7/2010 | Ma et al. |
| 2010/0205479 A1 | 8/2010 | Akutsu et al. |
| 2010/0214949 A1 | 8/2010 | Smith et al. |
| 2010/0275199 A1 | 10/2010 | Smith et al. |
| 2010/0290485 A1 | 11/2010 | Martini et al. |
| 2010/0318609 A1 | 12/2010 | Lahiri et al. |
| 2010/0322255 A1 | 12/2010 | Hao et al. |
| 2011/0016215 A1 | 1/2011 | Wang |
| 2011/0022695 A1 | 1/2011 | Dalal et al. |
| 2011/0026537 A1 | 2/2011 | Kolhi et al. |
| 2011/0032830 A1 | 2/2011 | Merwe et al. |
| 2011/0075664 A1 | 3/2011 | Lambeth et al. |
| 2011/0075674 A1 | 3/2011 | Li et al. |
| 2011/0085557 A1 | 4/2011 | Gnanasekaran et al. |
| 2011/0085559 A1 | 4/2011 | Chung et al. |
| 2011/0110374 A1 | 5/2011 | Boucadair et al. |
| 2011/0119748 A1 | 5/2011 | Edwards et al. |
| 2011/0134931 A1 | 6/2011 | Merwe et al. |
| 2011/0142053 A1 | 6/2011 | Merwe et al. |
| 2011/0145390 A1 | 6/2011 | Kakadia et al. |
| 2011/0194567 A1 | 8/2011 | Shen |
| 2011/0202675 A1 | 8/2011 | Faulk, Jr. |
| 2011/0261825 A1 | 10/2011 | Ichino |
| 2011/0283017 A1 | 11/2011 | Alkhatib et al. |
| 2011/0299534 A1 | 12/2011 | Koganti et al. |
| 2011/0310899 A1 | 12/2011 | Alkhatib et al. |
| 2011/0317703 A1 | 12/2011 | Dunbar et al. |
| 2012/0005299 A1* | 1/2012 | Xu ................ H04L 69/40 709/208 |
| 2012/0014386 A1 | 1/2012 | Xiong et al. |
| 2012/0014387 A1 | 1/2012 | Dunbar et al. |
| 2012/0039338 A1 | 2/2012 | Morimoto |
| 2012/0066371 A1 | 3/2012 | Patel et al. |
| 2012/0096159 A1 | 4/2012 | Short et al. |
| 2012/0099591 A1 | 4/2012 | Kotha et al. |
| 2012/0131643 A1 | 5/2012 | Cheriton |
| 2012/0144014 A1 | 6/2012 | Natham et al. |
| 2012/0173757 A1 | 7/2012 | Sanden |
| 2012/0182992 A1 | 7/2012 | Cowart et al. |
| 2012/0236734 A1 | 9/2012 | Sampath et al. |
| 2012/0278802 A1 | 11/2012 | Nilakantan et al. |
| 2013/0007740 A1 | 1/2013 | Kikuchi et al. |
| 2013/0044636 A1 | 2/2013 | Koponen et al. |
| 2013/0044641 A1 | 2/2013 | Koponen et al. |
| 2013/0051399 A1* | 2/2013 | Zhang ................ H04L 41/0803 370/400 |
| 2013/0058346 A1 | 3/2013 | Sridharan et al. |
| 2013/0070745 A1 | 3/2013 | Nixon et al. |
| 2013/0089097 A1 | 4/2013 | Filsfils et al. |
| 2013/0125120 A1 | 5/2013 | Zhang et al. |
| 2013/0132531 A1* | 5/2013 | Koponen ............ H04L 67/1008 709/220 |
| 2013/0142048 A1 | 6/2013 | Gross, IV et al. |
| 2013/0145002 A1 | 6/2013 | Kannan et al. |
| 2013/0148541 A1 | 6/2013 | Zhang et al. |
| 2013/0148542 A1 | 6/2013 | Zhang et al. |
| 2013/0148543 A1 | 6/2013 | Koponen et al. |
| 2013/0148656 A1 | 6/2013 | Zhang et al. |
| 2013/0151661 A1 | 6/2013 | Koponen et al. |
| 2013/0151676 A1 | 6/2013 | Thakkar et al. |
| 2013/0201989 A1 | 8/2013 | Hu et al. |
| 2013/0266015 A1 | 10/2013 | Qu et al. |
| 2013/0266019 A1 | 10/2013 | Qu et al. |
| 2013/0268799 A1 | 10/2013 | Mestery et al. |
| 2013/0329548 A1 | 12/2013 | Nakil et al. |
| 2013/0339544 A1 | 12/2013 | Mithyantha |
| 2014/0003434 A1 | 1/2014 | Assarpour et al. |
| 2014/0016501 A1 | 1/2014 | Kamath et al. |
| 2014/0195666 A1 | 7/2014 | Dumitriu et al. |
| 2014/0207968 A1 | 7/2014 | Kumar et al. |
| 2014/0310418 A1 | 10/2014 | Sorenson, III et al. |
| 2015/0063364 A1 | 3/2015 | Thakkar et al. |
| 2015/0103838 A1 | 4/2015 | Zhang et al. |
| 2015/0117454 A1 | 4/2015 | Koponen et al. |
| 2015/0189009 A1 | 7/2015 | Bemmel |
| 2015/0263946 A1 | 9/2015 | Tubaltsev et al. |
| 2015/0271303 A1 | 9/2015 | Neginhal et al. |
| 2016/0127509 A1 | 5/2016 | Uriel |
| 2016/0142257 A1 | 5/2016 | Udupi et al. |
| 2016/0198003 A1 | 7/2016 | Luft |
| 2016/0226762 A1 | 8/2016 | Zhang et al. |
| 2016/0335107 A1 | 11/2016 | Behera et al. |
| 2016/0380812 A1 | 12/2016 | Chanda et al. |
| 2017/0019373 A1 | 1/2017 | Meng et al. |
| 2017/0054628 A1* | 2/2017 | Tomotaki ............ H04L 12/4633 |
| 2017/0317954 A1 | 11/2017 | Masurekar et al. |
| 2018/0062923 A1 | 3/2018 | Katrekar et al. |
| 2018/0063176 A1 | 3/2018 | Katrekar et al. |
| 2018/0063193 A1 | 3/2018 | Chandrashekhar et al. |
| 2018/0063231 A1 | 3/2018 | Park |
| 2018/0176124 A1 | 6/2018 | Kancherla et al. |
| 2018/0176307 A1 | 6/2018 | Kancherla et al. |
| 2019/0014032 A1 | 1/2019 | Zhang et al. |
| 2019/0020580 A1 | 1/2019 | Boutros et al. |
| 2019/0104413 A1* | 4/2019 | Cidon ................ H04L 12/4625 |
| 2019/0173757 A1 | 6/2019 | Hira et al. |
| 2019/0173780 A1 | 6/2019 | Hira et al. |
| 2019/0190885 A1 | 6/2019 | Krug et al. |
| 2019/0238429 A1 | 8/2019 | Chanda et al. |
| 2019/0342215 A1 | 11/2019 | Jain et al. |
| 2020/0007497 A1 | 1/2020 | Jain et al. |
| 2020/0014638 A1 | 1/2020 | Chen et al. |
| 2020/0036675 A1 | 1/2020 | Tarasuk-Levin |
| 2020/0067733 A1 | 2/2020 | Hira et al. |
| 2020/0067734 A1 | 2/2020 | Hira et al. |
| 2020/0287964 A1 | 9/2020 | Capper et al. |
| 2020/0296155 A1 | 9/2020 | McGrath et al. |
| 2020/0366741 A1 | 11/2020 | Kancherla et al. |
| 2021/0067378 A1 | 3/2021 | Natarajan et al. |
| 2021/0067413 A1 | 3/2021 | Natarajan et al. |
| 2021/0099388 A1* | 4/2021 | Abhigyan ............ H04L 45/56 |
| 2021/0203688 A1 | 7/2021 | Ghule et al. |
| 2021/0234898 A1 | 7/2021 | Desai et al. |
| 2021/0385155 A1 | 12/2021 | Suryanarayana et al. |
| 2022/0021615 A1 | 1/2022 | Boutros et al. |
| 2022/0021645 A1 | 1/2022 | Boutros et al. |
| 2022/0030060 A1 | 1/2022 | Jain et al. |
| 2022/0038309 A1 | 2/2022 | Boutros et al. |

(56) References Cited

U.S. PATENT DOCUMENTS

2022/0038310 A1 2/2022 Boutros et al.
2022/0038379 A1 2/2022 Boutros et al.
2022/0045881 A1 2/2022 Natarajan et al.

FOREIGN PATENT DOCUMENTS

| EP | 4078935 | A1 | 10/2022 |
|---|---|---|---|
| JP | 2003069609 | A | 3/2003 |
| JP | 2003124976 | A | 4/2003 |
| JP | 2003318949 | A | 11/2003 |
| WO | 2005112390 | A1 | 11/2005 |
| WO | 2008095010 | A1 | 8/2008 |
| WO | 2021040933 | A1 | 3/2021 |
| WO | 2022015394 | A1 | 1/2022 |
| WO | 2022026012 | A1 | 2/2022 |

OTHER PUBLICATIONS

Casado, Martin, et al., "Virtualizing the Network Forwarding Plane," Dec. 2010, 6 pages.

Cui, Y., et al., "Lightweight 4over6: An Extension to the DS-Lite Architecture," draft-cui-softwire-b4-translated-ds-ite-11, Feb. 25, 2013, 17 pages, IETF Trust.

Cui, Y., et al., "Lightweight 4over6: An Extension to the Dual-Stack Lite Architecture," IETF RFC 7596, Jul. 2015, 22 Pages, IETF.

Dumitriu, Dan Mihai, et al., (U.S. Provisional U.S. Appl. No. 61/514,990), filed Aug. 4, 2011, 31 pages.

Durand, A., et al., "Dual-Stack Lite Broadband Deployments Following IPv4 Exhaustion," IETF RFC 6333, Aug. 2011, 32 pages, IETF.

Farrer, Ian, "The TeraStream IPv6 Native Network Architecture: How to Build a Modern Service Provider Using Pv6 and Optics," Sep. 12, 2012, 32 pages, Deutsche Telecom AG.

Koponen, Teemu, et al., "Network Virtualization in Multi-tenant Datacenters," Technical Report TR-2013-001E, Aug. 2013, 22 pages, VMware, Inc., Palo Alto, CA, USA.

PCT International Search Report and Written Opinion for Commonly Owned International Patent Application PCT/US2021/030371, mailed Aug. 17, 2021, 16 pages, International Searching Authority (EPO).

Pepelnjak, Ivan, "TeraStream Part 2: Lightweight 4over6 and Network Function Virtualization (NFV)," Nov. 27, 2013, 6 pages, ipSpace.net AG.

Potter, F. J. M., et al., "The Integration of Ethernet Virtual Private Network in Kubernetes," Nov. 2019, 35 bages, retrieved from https://rp.os3.nl/2019-2020/p58/report.pdf.

Wang, Anjing, et al., "Network Virtualization: Technologies, Perspectives, and Frontiers," Journal of Lightwave Technology, Feb. 15, 2013, 15 pages, IEEE.

* cited by examiner

FACILITATING DISTRIBUTED SNAT SERVICE

CLAIM OF BENEFIT TO PRIOR APPLICATIONS

This application is a continuation application of U.S. patent application Ser. No. 16/931,196, filed Jul. 16, 2020, now published as U.S. Patent Publication 2022/0021645. U.S. patent application Ser. No. 16/931,196, now published as U.S. Patent Publication 2022/0021645, is hereby incorporated by reference.

BACKGROUND

Many networks rely on the use of source network address translation (SNAT) to translate addresses in an address space used within the network to addresses that are globally unique when communicating with external networks. Because SNAT is a stateful service, some networks provide SNAT at centralized locations (e.g., an SNAT server). However, providing centralized SNAT can lead to bottlenecks as all traffic using SNAT must traverse the centralized SNAT provider. To solve this bottleneck problem, some networks use a distributed SNAT architecture. However, a distributed SNAT architecture has its own challenges. For example, since the SNAT operation performed by each instance of the distributed SNAT uses a same IP address, traffic traversing a provider gateway device in some cases will be forwarded to a randomly selected SNAT instance which for a system with "N" distributed SNAT instances will lead to a packet being directed to a distributed SNAT instance that does not store the state information for the packet (N−1) out of N times.

Similarly, stateful load balancing operations for a set of workload compute nodes executing on multiple host computers available at a shared virtual internet protocol (VIP) suffer from the same issues. Accordingly, a solution that simultaneously solves the bottleneck and misdirection issues for providing middlebox services such as SNAT and stateful load balancing is required.

BRIEF SUMMARY

Some embodiments of the invention provide novel methods for facilitating a distributed middlebox service operation (e.g., a distributed SNAT (dSNAT) or distributed load balancing (dLB) middlebox service) for a first network at a host computer in the first network on which the middlebox service operation is performed and a gateway device between the first network and a second network. The novel methods enable a distributed middlebox service (e.g., dSNAT or dLB) that provides a stateful middlebox service at multiple host computers, thus avoiding the bottleneck problem associated with providing stateful middlebox services at gateways and also significantly reduces the need to redirect packets received at the wrong host by using a capacity of off-the-shelf gateway devices to perform IPv6 encapsulation for IPv4 packets and assigning locally unique IPv6 addresses to each host executing a distributed middlebox service instance.

The method configures the gateway device to receive packets destined for a distributed middlebox service and identify, based on a destination internet protocol version 4 (IPv4) address and a port specified in an IPv4 header of the received packet, an IP version 6 (IPv6) address to use to forward the received packet to a particular host computer on which a middlebox service instance associated with the destination IPv4 address executes. In some instances, the destination IPv4 address is an IPv4 VIP address associated with a dLB middlebox service or an IPv4 address used by a dSNAT as a source address for packets going from the first network to external networks. The gateway device then encapsulates the packet with an IPv6 header using the identified IPv6 address and forwards the encapsulated packet based on an IPv6 routing table of the gateway device.

The host computer is configured to receive encapsulated packets destined to the identified IPv6 address from the gateway device and remove the encapsulation to provide the inner IPv4 packet to a middlebox service instance executing on the host computer based on the IPv4 address in a header of the inner IPv4 packet. The middlebox service instance performs an address replacement operation (e.g., a lookup in a connection tracker that associates translated IP addresses and ports into original IP addresses and ports, or replaces a VIP destination address and port with a workload IP address and port) to replace the IP address and port number in the IPv4 header with an IPv4 address and port used by a source machine in the first network. In some embodiments, the middlebox service instance executing on the host computer is assigned a range of port numbers for performing the middlebox service operation for packets going from the first network to external networks, in the case of dSNAT or, in the case of dLB, is assigned a range of port numbers for which to receive packets.

The host computer, in some embodiments, is configured to advertise the availability of an IPv6 address prefix that is based on the IPv4 used by the middlebox service instance as a source address for packets going from the first network to external networks and the range of port numbers assigned to the middlebox service instance. In some embodiments, the advertised IPv6 address prefix begins with 16 bits that are not assigned to be globally unique in IPv6 (e.g., FC00) followed by the IPv4 address used by the middlebox service and then followed by the set of bits in the 16-bit port address that are common to the range of port numbers assigned to the middlebox service instance executing on the host computer (e.g., the first 6 bits common to a range of 1024 assigned port numbers). Packets processed by the middlebox service instance executing on a host computer that are destined for an external network, in some embodiments, are sent from the host without encapsulation in an IPv6 header using the advertised IPv6 address as a source IP address. While the IPv6 address associated with the middlebox service instance is not used in encapsulating the packet, in some embodiments, other encapsulation may be used to reach the gateway device.

The advertisement, in some embodiments, is made by a border gateway protocol (BGP) instance executing on the host computer (e.g., a managed forwarding element). In some embodiments, the advertisement is made to a route reflector (e.g., a route server) that advertises the availability of the IPv6 address prefix at the host computer to other network elements including the gateway device or set of gateway devices. The advertisement, in some embodiments, includes an instruction to the gateway device to identify the IPv6 address based on an IPv4 address and port number of packets received at the gateway device and encapsulate the IPv4 packets with the identified IPv6 address. In other embodiments, the advertised IPv6 address is based on existing functions of a hardware gateway device for handling IPv6 encapsulation of IPv4 packets.

In some embodiments, a controller computer cluster (i.e., a set of one or more controller computers) of the first network provides configuration information to network elements to facilitate the distributed middlebox service operation for the first network. The configuration information, in some embodiments, includes a set of middlebox service records and IPv6 routing table entries provided to a gateway device. The middlebox service records map combinations of the IPv4 used by a particular middlebox service operation and destination port number to an IPv6 destination address. In some embodiments, the middlebox service record is a policy-based routing (PBR) rule that defines an algorithm for generating an IPv6 address from an IPv4 destination address and a port number included in an IPv4 header and specifies an IPv4 destination address for which the algorithm should be applied. The IPv6 routing table entries, in some embodiments, each identify an IPv6 address prefix associated with a particular host computer in a set of multiple host computers that each execute a middlebox service instance and a next hop towards the particular host computer.

The controller computer cluster configures the middlebox service instances to use a particular IPv4 address when performing the middlebox service operation and assigns, to each middlebox service instance of a particular middlebox service, a non-overlapping range of port numbers to use. In some embodiments, the IPv4 address and port number range are provided to the host computer (e.g., an MFE of the host computer) to identify the IPv6 address prefix that corresponds to the IPv4 address and range of assigned port numbers and to advertise the availability of the identified IPv6 address at the host computer. The size of the port number ranges assigned to the middlebox service instances, in some embodiments, are fixed by an administrator based on a maximum number of expected middlebox service instances (e.g., for an expected maximum of 64 middlebox service instances, creating 64 different port number ranges each including 1024 ports that are each assigned to a middlebox service instance on startup). In other embodiments, the size of the port number ranges is dynamic and may change based on the number of active middlebox service instances. The port number ranges may also vary in size between middlebox service instances. For example, a larger port number range is assigned to a first middlebox service instance executing on a host computer executing a larger number of workload machines using the middlebox service than a second middlebox service instance executing on a host computer executing a smaller number of workload machines using the middlebox service.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings, and the Claims is needed. Moreover, the claimed subject matters are not to be limited by the illustrative details in the Summary, Detailed Description, and the Drawing.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
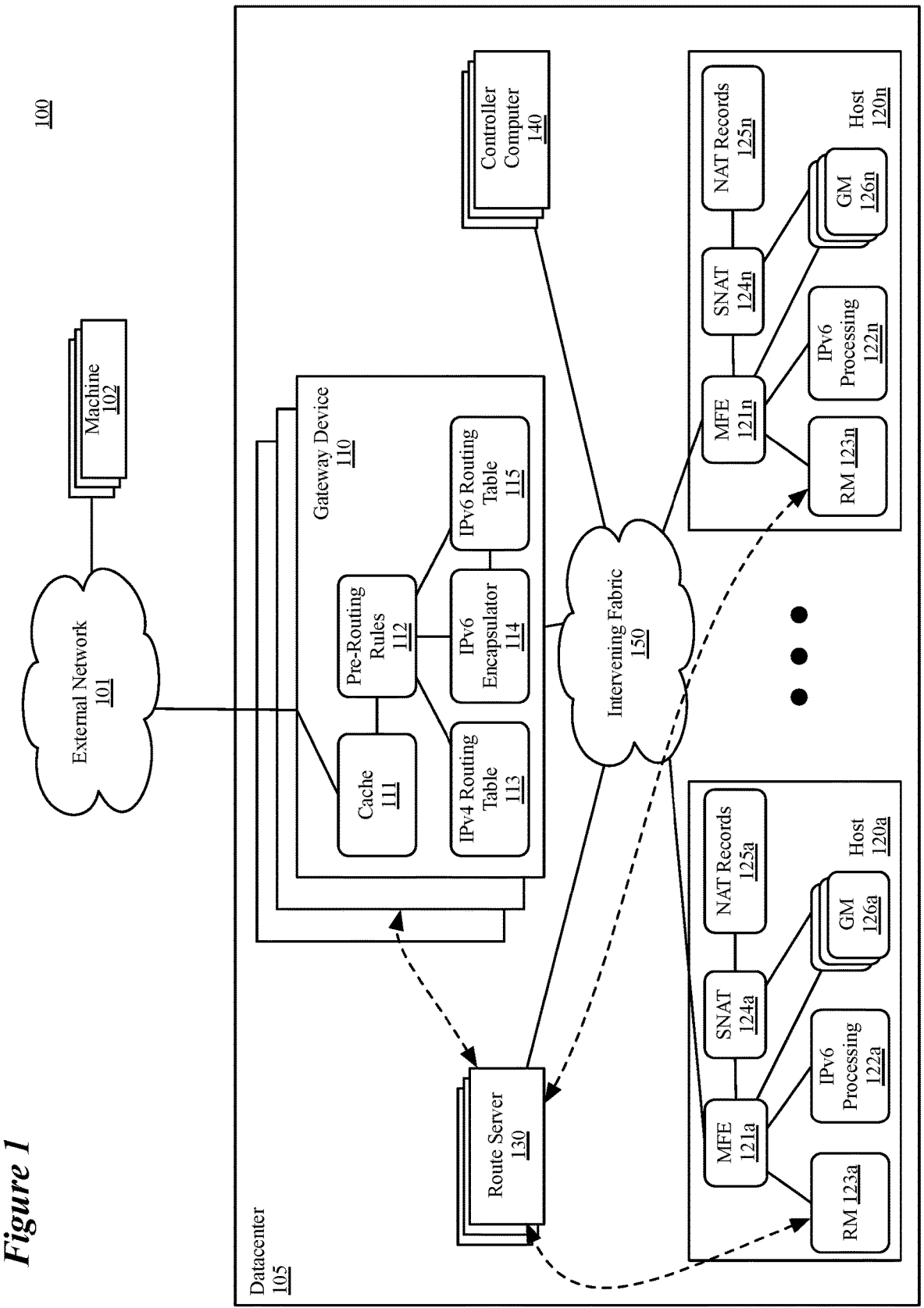
FIG. 1 illustrates an exemplary network in which the novel method for facilitating the provision of a distributed SNAT middlebox service operation for a first network is performed.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide novel methods for facilitating a distributed middlebox service operation (e.g., a distributed SNAT (dSNAT) or distributed load balancing (dLB) middlebox service) for a first network at a host computer in the first network on which the middlebox service operation is performed and a gateway device between the first network and a second network. The novel methods enable a distributed middlebox service (e.g., dSNAT or dLB) that provides a stateful middlebox service at multiple host computers, thus avoiding the bottleneck problem associated with providing stateful middlebox services at gateways and also significantly reduces the need to redirect packets received at the wrong host by using a capacity of off-the-shelf gateway devices to perform IPv6 encapsulation for IPv4 packets and assigning locally unique IPv6 addresses to each host executing a distributed middlebox service instance. The discussion below, in part, focuses on a dSNAT and dLB middlebox service, however one of ordinary skill in the art will appreciate that the methods discussed can be applied to a any distributed, stateful middlebox service using a same IP address at multiple host computers.

The method configures the gateway device to receive packets destined for an IPv4 VIP of the dLB service or an IPv4 address used by the dSNAT service as a source address for packets going from the first network to external networks and identify, based on an IPv4 destination address and a port specified in an IPv4 header of the received packet, an IP version 6 (IPv6) address to use to forward the received packet to the host computer on which the dSNAT operation was performed. The gateway device then encapsulates the packet with an IPv6 header using the identified IPv6 address and forwards the encapsulated packet based on an IPv6 routing table of the gateway device.

As used in this document, packet refers to a collection of bits in a particular format sent across a network. A packet, in some embodiments, is referred to as a data message. One of ordinary skill in the art will recognize that the term packet is used in this document to refer to various formatted collections of bits that are sent across a network. The formatting of these bits can be specified by standardized protocols or non-standardized protocols. Examples of packets following standardized protocols include Ethernet frames, IP packets, TCP segments, UDP datagrams, etc. Also, as used in this document, references to L2, L3, L4, and L7 layers (or layer 2, layer 3, layer 4, and layer 7) are references respectively to the second data link layer, the third network layer, the fourth transport layer, and the seventh application layer of the OSI (Open System Interconnection) layer model.

Also, in this example, the term managed forwarding element (MFE) refers to software forwarding elements or hardware forwarding elements that are configured by a controller computer cluster (i.e., a set of one or more controller computers that provide configuration data to network elements) to implement a logical network comprising a set of logical forwarding elements (LFEs). In some embodiments, each LFE is a distributed forwarding element that is implemented by configuring multiple MFEs on multiple host computers. To do this, each MFE or a module associated with the MFE in some embodiments is configured to encapsulate the data messages of the LFE with an overlay network header that contains a virtual network identifier (VNI) associated with the overlay network. As such, the LFEs are said to be overlay network constructs that span multiple host computers in the discussion below.

The LFEs also span, in some embodiments, configured hardware forwarding elements (e.g., top of rack switches). In some embodiments, the set of LFEs includes a logical switch that is implemented by configuring multiple software switches or related modules on multiple host computers. In other embodiments, the LFEs can be other types of forwarding elements (e.g., logical routers), or any combination of forwarding elements (e.g., logical switches and/or logical routers) that form logical networks or portions thereof. Many examples of LFEs, logical switches, logical routers and logical networks exist today, including those provided by VMware's NSX network and service virtualization platform.

FIG. 1 illustrates an exemplary network 100 in which the novel method for facilitating the provision of a distributed SNAT operation for a first network is performed. FIG. 1 illustrates a network 100 comprising an external network 101 connecting a set of machines 102 outside of a datacenter 105 with guest machines (GMs) 126 executing on a number of hosts 120 in the datacenter 105 (e.g., a public cloud datacenter or set of datacenters). The gateway devices 110 execute between the internal network and the external network 101 and are configured, as discussed below in relation to FIG. 11, to facilitate the provision of the distributed middlebox service for communications between the external machines 102 and the internal compute nodes (e.g., GMs 126). The gateway device 110 includes a cache 111 that stores information regarding forwarding decisions made for previously received packets and a set of pre-routing rules 112 that, in some embodiments, includes policy-based routing rules based on IP (either IPv4 or IPv6) addresses. After performing a lookup in the cache 111 and performing a lookup in the set of pre-routing rules 112, packets may be routed using an IPv4 routing table, or an IPv6 routing table, or may be sent to an IPv6 encapsulator to be encapsulated in an IPv6 header and then routed based on the IPv6 routing table.

The system 100 also includes a set of controller computers 140 that provide configuration information to the set of host computers 120 to implement a set of logical forwarding elements (e.g., using the MFEs 121), an IPv6 processing module 122 that processes received IPv6 packets, a routing machine (RM) 123 that acts as a BGP instance to interact with the set of route servers 130, a distributed middlebox service instance 124 (e.g., the SNAT instances 124 that, in the illustrated embodiment, provide a dSNAT middlebox service), and a set of compute nodes (e.g., the GMs 126). The host computers 120 also include a set of NAT records 125 that, in some embodiments, are caches recording associations between internal IP address/port pairs and ports selected by the SNAT instance 124 as external ports for each IP address/port pair. In some embodiments, the cache records also store an IP address of the external machine along with the port selected by the SNAT instance 124 to allow the SNAT instance 124 to use a same port for multiple data message flows established with different external machines using different IP addresses.

The system 100 also includes a set of route servers 130 (also referred to as route reflectors) that each receive routing information from multiple network elements and provides the routing information to other network elements to simplify the exchange of routing information. For example, instead of using a full mesh connecting each BGP instance (e.g., RM 123), each BGP instance interacts with the route servers 130 to reduce the number of advertisements made by each BGP instance. The datacenter 105 also includes the intervening fabric 150 that provides the physical connections between the illustrated network elements.

Figure 2:
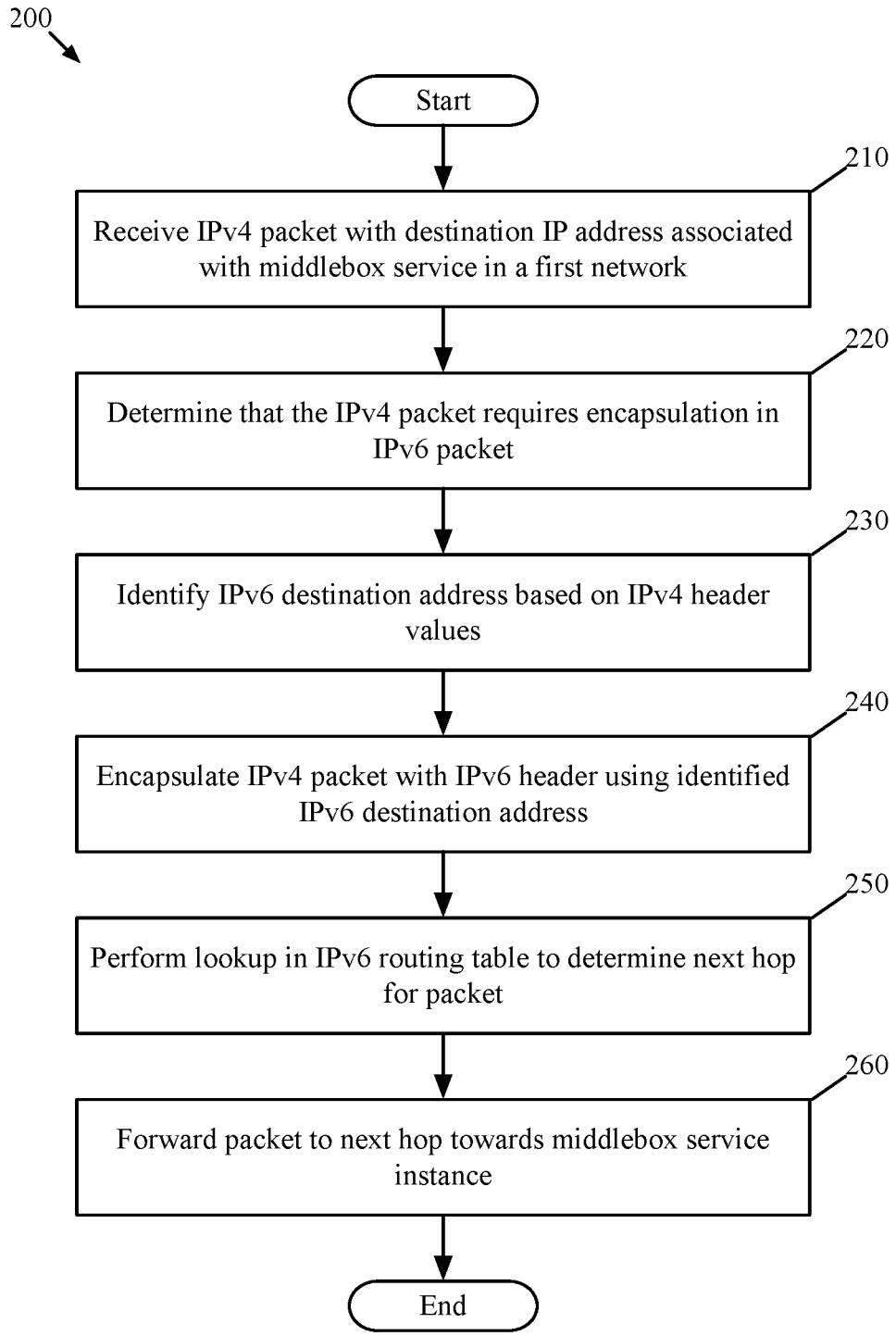
FIG. 2 conceptually illustrates a process performed by a gateway device to process a received packet that is destined to a particular middlebox service instance.

The function of the various elements of FIG. 1 will be discussed in more detail in relation to FIGS. 2-4. FIG. 2 conceptually illustrates a process 200 performed by a gateway device (e.g., the gateway device 110) to process a received packet that is destined to a particular middlebox service instance (e.g., SNAT instance 124a). In some embodiments, the gateway device is an off-the-shelf gateway device with the capability to encapsulate an IPv4 packet in an IPv6 packet and to generate the IPv6 header of the IPv6 packet using either a set of rules or a set of records specifying IPv6 headers to use based on IPv4 header values. In other embodiments, the gateway device is a fully programmable forwarding element that is programmed to carry out the operations of process 200. One of ordinary skill in the art will appreciate that process 200 can be performed for packets destined for an IPv4 address associated with any of a dSNAT middlebox service, a dLB middlebox service for a set of load balanced set of workload compute nodes, or any distributed middlebox service using a same IP address at multiple middlebox service instances executing on multiple host computers.

The process 200 begins by receiving (at 210) an IPv4 packet destined to a particular middlebox service instance (e.g., SNAT instance 124a) executing on a particular host computer (e.g., host computer 120a) with a destination address that is associated with the middlebox service (i.e., all the middlebox service instances). The IPv4 header identifies the source machine in the external network by a source IP address and identifies a destination IP address and port that is a source IP address and port used by the SNAT instance that processes packets for the communication session (also referred to as a packet flow or connection) between the external machine and the internal compute node serviced by the middlebox service instance.

The process then determines (at 220) that the IPv4 packet requires encapsulation in an IPv6 packet. In some embodiments, the determination for a first packet in a particular flow of packets received from an external machine is made based on a middlebox service record. The middlebox service record, in some embodiments is an IPv4 routing table entry for the IPv4 destination address that indicates that the packet requires encapsulation in an IPv6 packet. In some embodiments, the IPv4 routing entry also indicates either (1) a specific IPv6 destination address to use for encapsulating the IPv4 packet based on the IPv4 header values (e.g., an IPv4 destination address and destination port (for SNAT) or source port (for LB)) or (2) an algorithm for generating an IPv6 destination address to use in the IPv6 encapsulation header. In some embodiments, the middlebox service record is a policy based routing (PBR) rule that specifies encapsulation for all packets destined to the IPv4 address associated with the middlebox service. As with the IPv4 routing entry the PBR rule can either specify an IPv6 destination address or a method for generating the IPv6 destination address. In some embodiments, PBR rule is included in the pre-routing rules 112. After the first received packet for a particular flow of packets from an external machine, in some embodiments, the determination for subsequent packets of the particular flow is made based on a cache record that includes the determination made for the first packet of the particular flow and that is stored in cache 111.

After determining (at 220) that the IPv4 packet requires encapsulation in an IPv6 packet, the process 200 identifies (at 230) the IPv6 destination address to use in the IPv6 encapsulation header based on the IPv4 header values (e.g., a destination IPv4 address and a destination port (for dSNAT) or a source port (for dLB)). In some embodiments, the identification is based on an IPv6 destination address specified in the middlebox service record for the IPv4 destination address and port pair. In other embodiments, the identification is based on an algorithm or other programmatic method of generating an IPv6 destination address from IPv4 headers. The algorithm in some embodiments takes an IPv6 prefix that is used for locally unique addresses (e.g., FC00::/8) and appends the IPv4 destination address and the destination (or source) port followed by zeros (zeros are used for simplicity but any set of trailing bits would work in some embodiments).

After identifying (at 230) the IPv6 destination address, the IPv4 packet is encapsulated (at 240) with an IPv6 header using the identified IPv6 address as a destination address. In some embodiments, the encapsulation is done by an IPv6 encapsulation module (e.g., IPv6 encapsulator 114). The destination port, in some embodiments, is the IPv4 destination port but, in other embodiments, may be any port. The source IPv6 address and port, in some embodiments, are an IPv6 address and port associated with the gateway device. The process 200 then performs (at 250) a lookup in an IPv6 routing table (e.g., IPv6 routing table 115) to identify the next hop for the encapsulated date message. As will be discussed in more detail below, the gateway device is configured with a set of IPv6 routes (i.e., routing table entries) for each of a set of IPv6 address prefixes associated with a set of host computers that executes middlebox service instances that indicate the next hop for each IPv6 address prefix. In some embodiments, the IPv6 address prefixes are provided by a controller computer (e.g., as static routes). In other embodiments, the host computers (e.g., BGP instances executing on the host computers) advertise the IPv6 address prefixes as being available at the host computer. As will be discussed in more detail below, each middlebox service instance is assigned a range of port numbers that can be used to generate a unique IPv6 address prefix based on the algorithm described above for generating the IPv6 destination address.

Finally, the process 200 forwards (at 260) the IPv6 packet to the identified next hop towards the middlebox service instance and the process ends. In some embodiments, the packet is forwarded over an intervening network fabric (e.g., intervening fabric 150). The forwarding elements in the intervening fabric, in some embodiments, learn the next hop for the destination IPv6 address using standard protocols such as any or all of BGP, IGP, ARP, or any of the other route learning mechanisms known to one of ordinary skill in the art.

Figure 3A:
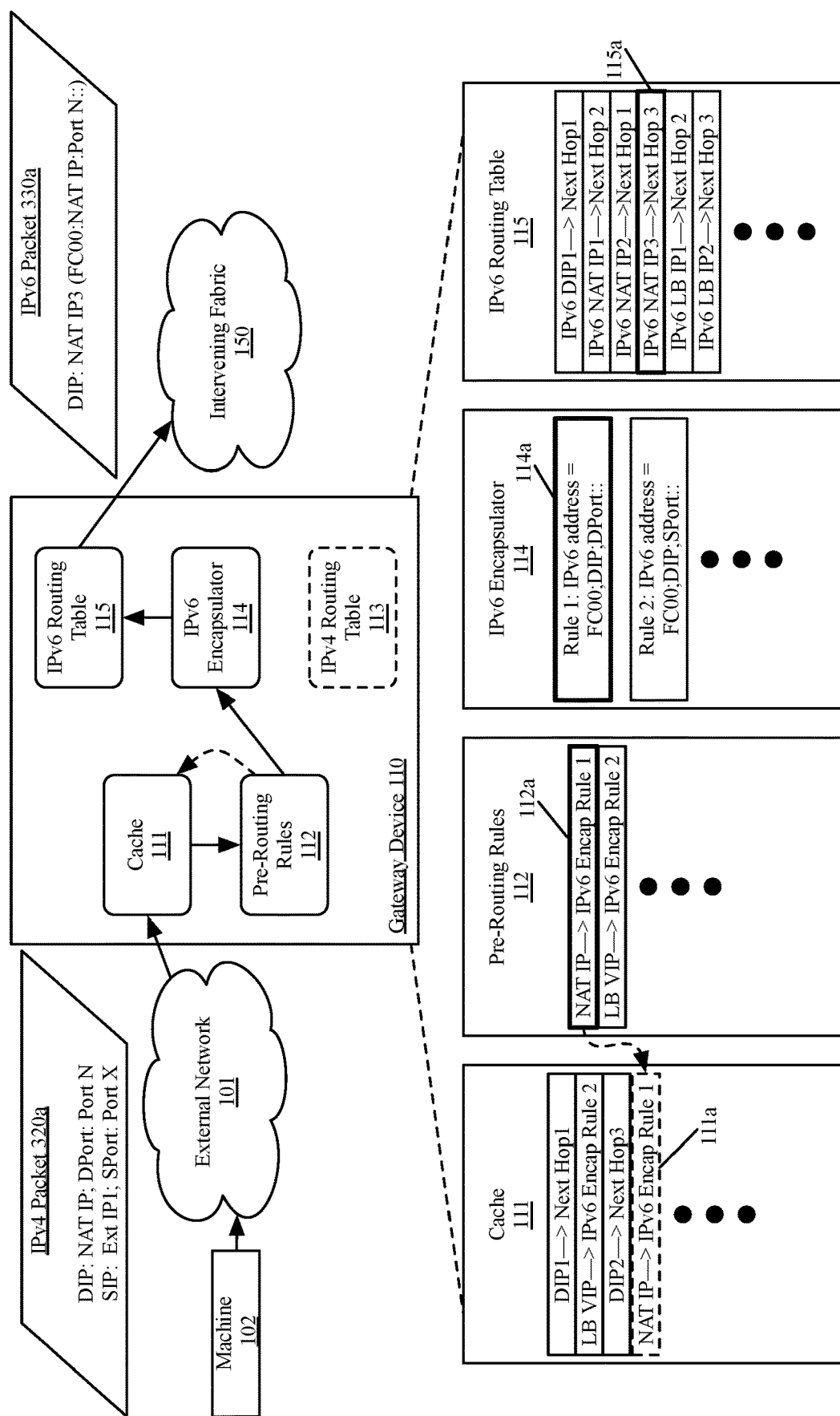
FIG. 3A illustrates packet processing at a gateway device as depicted in FIG. 1 for a first packet in a particular packet flow received from the external network.
Figure 3B:
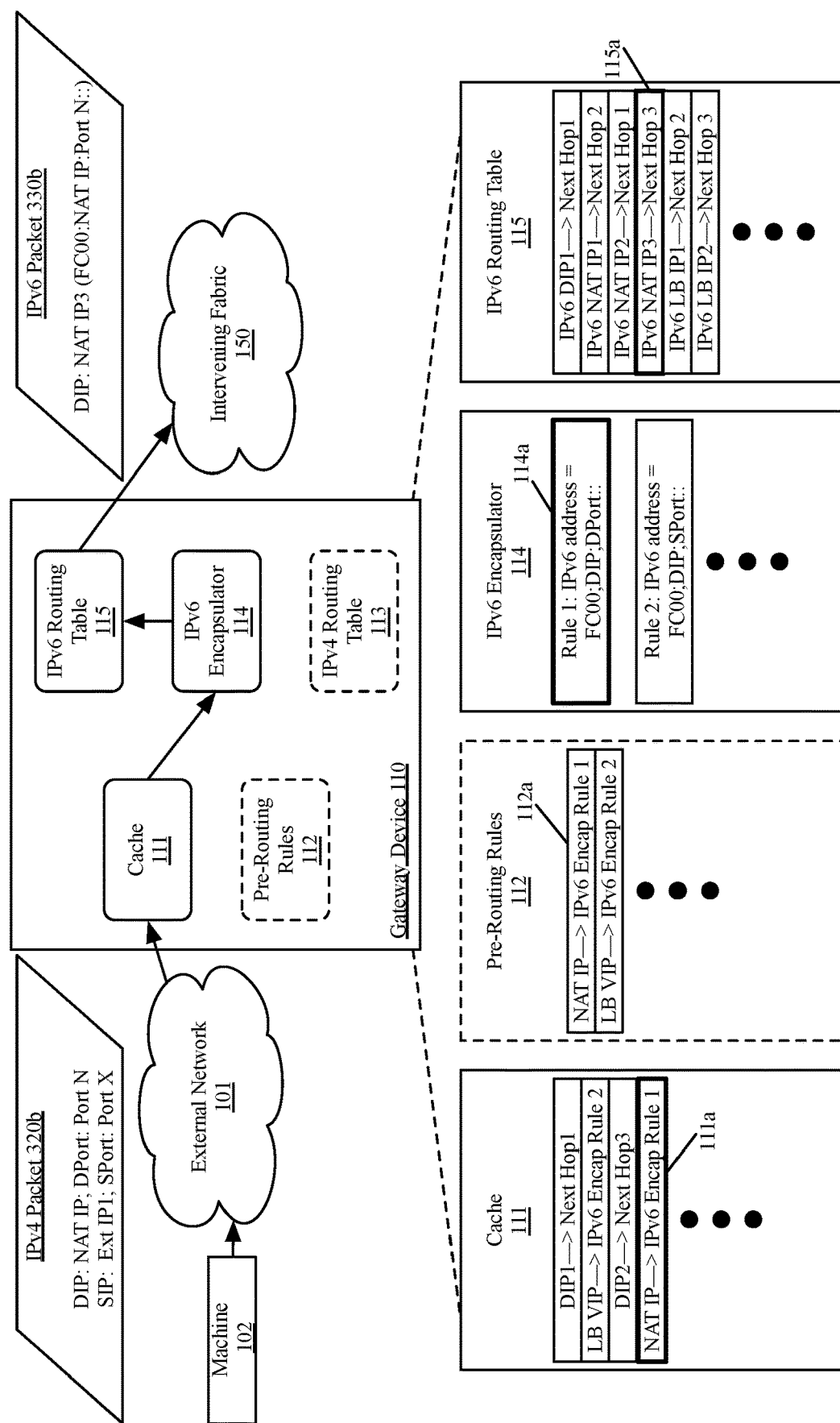
FIG. 3B illustrates packet processing at a gateway device as depicted in FIG. 1 for a subsequent packet in the particular packet flow for which the packet depicted in FIG. 3A was the first packet received from the external network.
Figure 4:
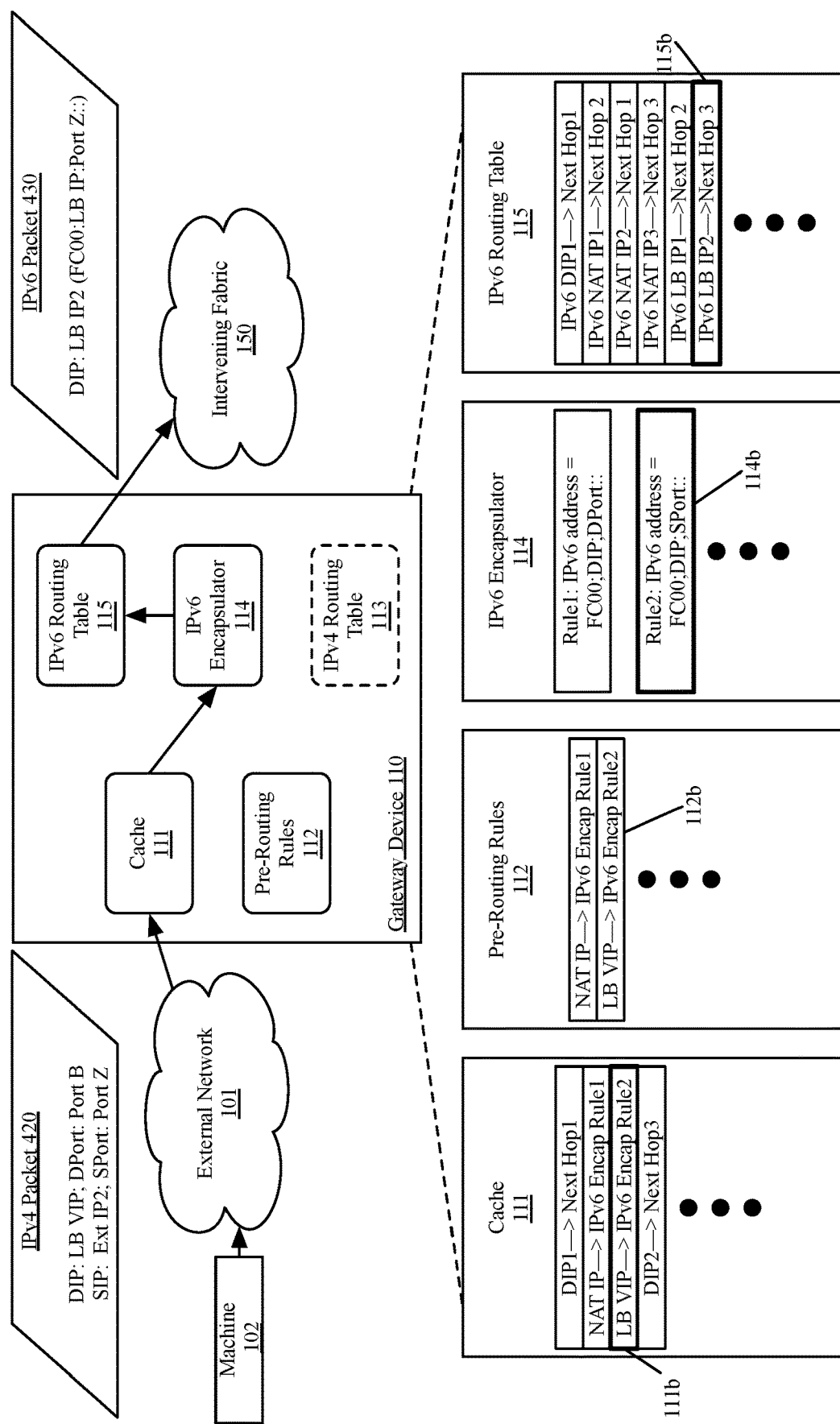
FIG. 4 illustrates packet processing at a gateway device as depicted in FIG. 1 for a subsequent packet in a particular packet flow destined to an LB VIP for which a packet was previously received from the external network.

Examples of packet processing for first and subsequent packets in a particular flow for different distributed middlebox services are illustrated in FIGS. 3A, 3B and 4. FIG. 3A illustrates packet processing at a gateway device 110 as depicted in FIG. 1 for a first packet 320a in a particular packet flow received from the external network 101. As shown packet 320a is received from a machine 102 in the external network 101 destined for the NAT IP address and Port N (i.e., the port selected by the SNAT as a source port). The packet is first compared to cache entries in cache 111 which does not yet include cache record 111a. Since no cache record is found, a lookup is performed in the set of pre-routing rules 112, and in the illustrated embodiment, a pre-routing rule 112a is identified as applying to the packet based on the destination IP (i.e., NAT IP). Based on identifying pre-routing rule 112a as applying to the packet, a cache record 111a is created in cache 111. In the illustrated embodiment, the cache record 111a identifies the result of the lookup in the pre-routing rules, however one of ordinary skill in the art will appreciate that the cache record, in other embodiments, identifies the specific IPv6 address used to encapsulate the packets in the flow based on the rule or the IPv6 encapsulation address and a next hop.

Based on the pre-routing rule 112a identified based on the destination IPv4 address (i.e., the IPv4 address associated with the dSNAT service (NAT IP)), the packet is passed to the IPv6 packet encapsulator 114 for encapsulation instead of being passed to IPv4 routing table 113 for forwarding based on the IPv4 header values. In the illustrated embodiment, the pre-routing rule 112a identifies an encapsulation rule stored by the IPv6 encapsulator that would be identified, as part of passing the packet, to the IPv6 encapsulator 114 to perform the encapsulation. In other embodiments, passing the packet to IPv6 encapsulator 114 comprises sending a rule (e.g., an algorithm) for generating the encapsulation header values. The IPv6 encapsulator 114 then encapsulates the packet with an IPv6 header packet based on the identified rule (i.e., rule 114a).

In the illustrated embodiment, the destination IPv6 address is generated by using an FC00 prefix that is used for locally unique addresses followed by the destination IP (i.e., NAT IP) followed by the destination port (Port N) followed by 0's. Other prefixes or filler bits are used in other embodiments, and one of ordinary skill in the art will recognize that this is just one of many possible algorithms for generating the IPv6 destination address that has been selected for simplicity. The IPv6 destination port, source IPv6 address, and IPv6 source port, in some embodiments, are, the original destination port, a source IPv6 address associated with the gateway device 110 and a randomly selected IPv6 source port. However, one of ordinary skill in the art will appreciate that other destination ports and source IPv6 address and port are used in other embodiments without affecting the routing of the packet to the particular host and dSNAT instance.

Once the packet is encapsulated in an IPv6 header including the generated IPv6 address, it is passed to an IPv6 forwarding operation represented by IPv6 routing table 115. A lookup in IPv6 routing table 115 identifies a matching routing table entry 115a that includes a next hop (i.e., next hop 3) interface that is used to forward the packet to its destination. In some embodiments, the IPv6 routing table entries for the NAT IP (and LB IP) are dynamic routes learned based on advertisements from the BGP instances on the host machines, while in other embodiments the routing table entries are static routes received from a controller computer in a set of controller computers (e.g., controller computer cluster 140). The IPv6 packet 330a is then forwarded to the destination host based on the IPv6 destination address (i.e., FC00:NAT IP:PortN::).

FIG. 3B illustrates packet processing at a gateway device 110 as depicted in FIG. 1 for a subsequent packet 320b in the particular packet flow for which packet 320a was the first packet received from the external network 101. As shown packet 320b is received from a machine 102 in the external network 101 destined for the NAT IP address and Port N (i.e., the port selected by the SNAT as a source port). The packet is first compared to cache entries in cache 111 which includes cache record 111a based on the first packet 320a received from the external network 101. The cache record 111a indicates that the packet 320b should be encapsulated in an IPv6 header according to a particular encapsulation rule (i.e., "IPv6 Encap Rule 1"). The packet and the rule identifier are passed, in some embodiments, to the IPv6 encapsulator 114, bypassing pre-routing rules 112. However, one of ordinary skill in the art will appreciate that the cache record, in other embodiments, identifies the specific IPv6 address used to encapsulate the packets in the flow based on the rule or the IPv6 encapsulation address and a next hop. The IPv6 encapsulator 114 then encapsulates the packet with an IPv6 header packet based on the identified rule (i.e., rule 114a).

In the illustrated embodiment, the destination IPv6 address is generated by using an FC00 prefix that is used for locally unique addresses followed by the destination IP (i.e., NAT IP) followed by the destination port (Port N) followed by 0's. Other prefixes or filler bits are used in other embodiments, and one of ordinary skill in the art will recognize that this is just one of many possible algorithms for generating the IPv6 destination address that has been selected for simplicity. The IPv6 destination port, source IPv6 address, and IPv6 source port, in some embodiments, are, the original destination port, a source IPv6 address associated with the gateway device 110 and a randomly selected IPv6 source port for the particular flow. However, one of ordinary skill in the art will appreciate that other destination ports and source IPv6 address and port are used in other embodiments without affecting the routing of the packet to the particular host and dSNAT instance.

Once the packet is encapsulated in an IPv6 header including the generated IPv6 address it is passed to an IPv6 forwarding operation represented by IPv6 routing table 115. A lookup in IPv6 routing table 115 identifies a matching routing table entry 115a that includes a next hop (i.e., next hop 3) interface that is used to forward the packet to its destination. The lookup in IPv6 routing table 115, in some embodiments, is not performed if the cache record 111a identifies the next hop interface to use after encapsulation. In some embodiments, the IPv6 routing table entries for the NAT IP (and LB IP) are dynamic routes learned based on advertisements from the BGP instances on the host machines, while in other embodiments the routing table entries are static routes received from a controller computer in the set of controller computers 140. The IPv6 packet 330b is then forwarded to the destination host based on the IPv6 destination address (i.e., FC00:NAT IP:PortN::).

FIG. 4 illustrates packet processing at a gateway device 110 as depicted in FIG. 1 for a subsequent packet 420 in a particular packet flow destined to the LB VIP for which a packet was previously received from the external network 101. As shown packet 420 is received from a machine 102 in the external network 101 destined for the LB VIP address and Port B (i.e., a port associated with the VIP). The packet is first compared to cache entries in cache 111 which includes cache record 111b based on the first packet received from the external network 101 for the particular packet flow destined to the LB VIP. The cache record 111b indicates that the packet 420 should be encapsulated in an IPv6 header according to a particular encapsulation rule (i.e., "IPv6 Encap Rule 2"). The packet and the rule identifier are passed, in some embodiments, to the IPv6 encapsulator 114, bypassing pre-routing rules 112. However, one of ordinary skill in the art will appreciate that the cache record, in other embodiments, identifies the specific IPv6 address used to encapsulate the packets in the flow based on the rule or the IPv6 encapsulation address and a next hop. The IPv6 encapsulator 114 then encapsulates the packet with an IPv6 header packet based on the identified rule (i.e., rule 114b).

In the illustrated embodiment, the destination IPv6 address is generated by using an FC00 prefix that is used for locally unique addresses followed by the destination IP (i.e., NAT IP) followed by the source port (Port Z) followed by 0's. The source port is used instead of the destination port, in some embodiments, because it is randomly selected from the possible port values when initiating a flow (e.g., a session or connection) and is then constant for the lifetime of the packet. This allows the flows to be distributed among multiple LB instances based on different source port ranges assigned to each LB instance while at the same time ensuring that the same LB instance that maintains state information for providing the LB service to a particular flow receives packets of that flow. On the other hand, if the destination port was used, in some instances, the LB VIP may be associated with servers listening on a specific port or ports such that the destination port will not allow for identifying a specific LB instance. In other embodiments, in which the destination port can be used to differentiate different hosts, the rule will be the same as that used for the NAT IP of FIG. 3. Other prefixes or filler bits are used in other embodiments, and one of ordinary skill in the art will recognize that this is just one of many possible algorithms for generating the IPv6 destination address that has been selected for simplicity. The IPv6 destination port, source IPv6 address, and IPv6 source port, in some embodiments, are, the original destination port, a source IPv6 address associated with the gateway device 110 and a randomly selected IPv6 source port for the particular flow. However, one of ordinary skill in the art will appreciate that other destination ports and source IPv6 address and port are used in other embodiments without affecting the routing of the packet to the particular host and dLB instance.

In some embodiments, even some stateful distributed services are advertised as being available at each host computer using a same network address. For example, a stateful distributed load balancing service for distributing requests received from clients in external networks, in some embodiments, relies on a set of gateways of the availability zone (AZ) to consistently send a same flow to a same host computer providing the distributed load balancing based on an equal cost multipathing (ECMP) operation performed at the gateway devices of the AZ across the host computers providing the distributed load balancing service. To enable this ECMP operation, in some embodiments, the routing machine on each host executing a distributed load balancer instance advertises the same VIP address as being available and the gateway devices of the AZ record the multiple advertised next hop addresses as being associated with the VIP as possible next hops. For received data messages addressed to the VIP, a gateway device of the AZ selects a particular next hop using an ECMP operation. In such embodiments, an acceptable number of redirection operations may be required upon a change in the number of host computers providing the distributed load balancing service such that it is not worth the effort to ensure that different host computers can be deterministically identified for each flow (or data message).

Once the packet is encapsulated in an IPv6 header including the generated IPv6 address it is passed to an IPv6 forwarding operation represented by IPv6 routing table 115. A lookup in IPv6 routing table 115 identifies a next hop (i.e., next hop 3) interface that is used to forward the packet to its destination. The lookup in IPv6 routing table 115, in some embodiments, is not performed if the cache record 111b identifies the next hop interface to use after encapsulation. In some embodiments, the IPv6 routing table entries for the LB IP (and NAT IP) are dynamic routes learned based on advertisements from the BGP instances on the host machines, while in other embodiments the routing table entries are static routes received from a controller computer in the set of controller computers 140. The IPv6 packet 430 is then forwarded to the destination host based on the IPv6 destination address (i.e., FC00:LBIP:PortZ::).

Figure 5:
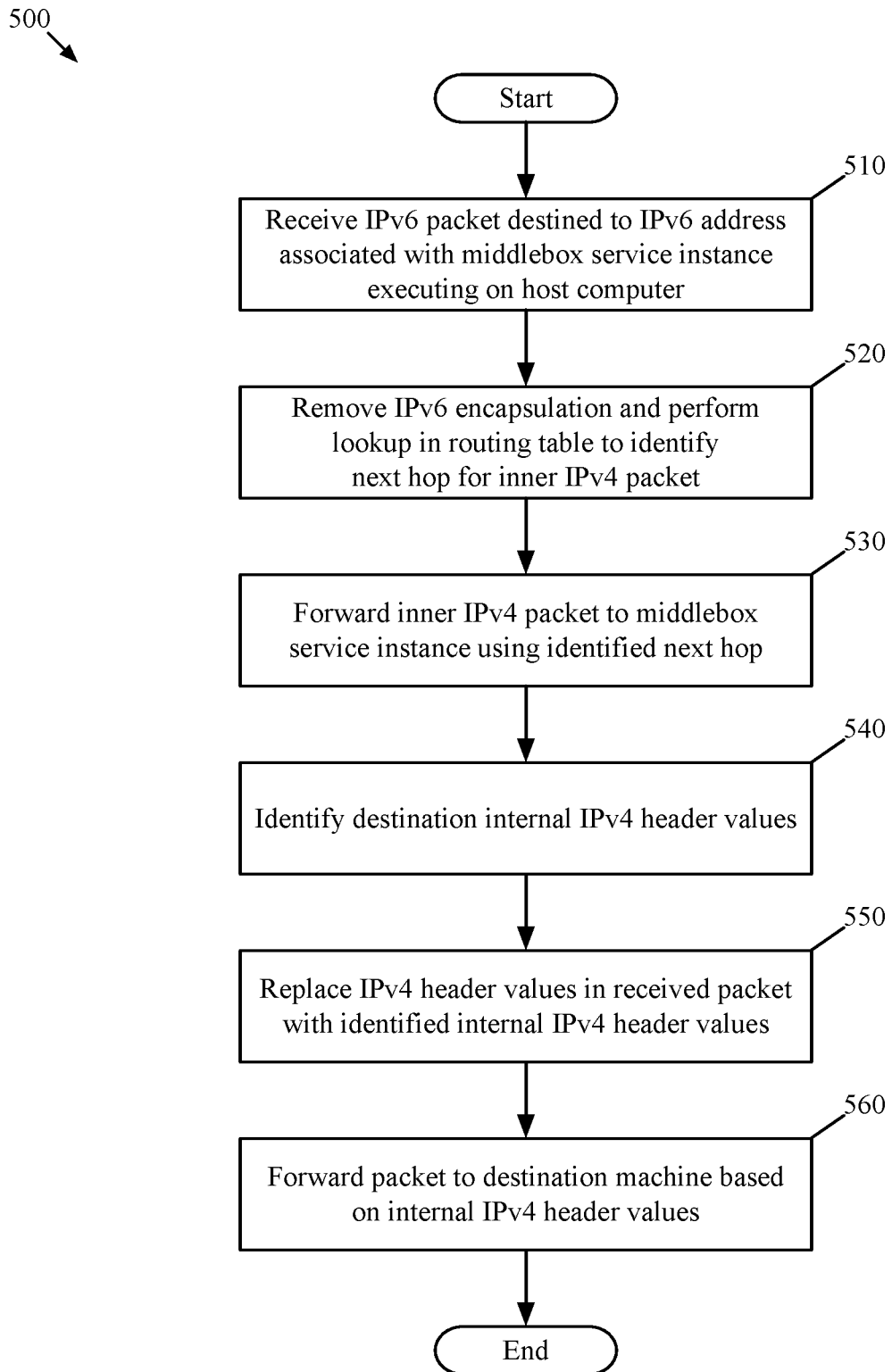
FIG. 5 conceptually illustrates a process performed at a host computer for processing a received IPv6 packet destined for a middlebox service instance executing on the host computer.

Once the gateway device has encapsulated and forwarded the packet, it will reach the host computer on which the destination distributed middlebox instance executes. The host computer is configured to receive encapsulated packets destined to the identified IPv6 address from the gateway device and remove the encapsulation to provide the inner IPv4 packet to a middlebox service instance executing on the host computer based on the IPv4 address in a header of the inner IPv4 packet. FIG. 5 conceptually illustrates a process 500 performed at a host computer for processing a received IPv6 packet destined for a middlebox service instance executing on the host computer. In some embodiments, the process 500 is performed by a host computer on which the middlebox service instance executes. In some embodiments, the host computer performs the process 500 using an MFE (e.g., MFE 121a), a software routing element (e.g., routing machine 123a), an IPv6 processing module (e.g., IPv6 processing module 122a), a distributed middlebox instance (e.g., SNAT 124a), and a storage (e.g., NAT Records 125a) storing records for doing an IPv4 translation operation, executing on the host computer. In other embodiments, some of the elements are combined (e.g., the MFE implements (or is) the software routing element and contains IPv6 packet processing instructions, while the distributed middlebox service instance includes the records used to perform the middlebox service). The process 500 begins by receiving (at 510) an IPv6 packet destined to the IPv6 address associated with the middlebox service instance executing on the host computer.

The process 500 then removes (at 520) the IPv6 encapsulation header and performs a lookup in a routing table to identify the next hop for the inner IPv4 packet. In some embodiments, the received packet is passed to an IPv6 processing module (e.g., 122) that is programmed with IPv6 routing rules and tables. The routing rules, in some embodiments, include a rule identifying IPv6 packets destined to a middlebox service instance as requiring removal of an IPv6 encapsulation header and being passed to an IPv4 routing table lookup (e.g., performed by an MFE or routing module). In some embodiments, the rule identifies a next hop and that the IPv6 encapsulation should be removed before forwarding the packet.

In other embodiments, the lookup is performed in an IPv4 routing table after removing the IPv6 encapsulation to identify the next hop towards the middlebox service instance. In some embodiments, the IPv6 processing module is an IPv6 stack of a dual stack routing element (an MFE or routing module) instead of an independent module. The lookup, in some embodiments, is performed in a first virtual routing and forwarding (VRF) context for a first logical network or tenant associated with the middlebox service instance. A virtual tunnel end point (VTEP), in some embodiments, receives the encapsulated packet based on an IPv6 address of the encapsulated packet. The VTEP is then responsible for decapsulating the packet and identifying a next hop based on a virtual network identifier and IPv4 address associated with the received IPv6 packet. The packet is then forwarded (at 530) towards the middlebox service instance with the IPv4 header, using the IPv4 header values in the packet received at the gateway device through the identified next hop interface.

The distributed middlebox service instance receives the packet and identifies (at 540) destination internal IPv4 header values to forward the data to the correct destination.

In some embodiments, identifying the destination IPv4 internal header values includes performing a lookup in a middlebox service record storage (e.g., a cache) that maintains associations between ports used to replace source ports for outgoing packets and source IPv4 addresses and ports. In some embodiments, the ports used to replace the source port for outgoing packets belong to a range of port numbers assigned to the middlebox service instance executing on the host computer (e.g., for the middlebox service instance to use to replace the source port of outgoing packets, or source ports that will be directed to the middlebox service instance). The destination port is used, in some embodiments, to perform the lookup in (e.g., query) the middlebox service record storage to identify an internal IPv4 address and port to replace a current (external) destination IPv4 address and port for forwarding the packet to the correct destination machine (e.g., a virtual machine, container, pod, etc.).

For a distributed LB instance, identifying the destination internal IPv4 address includes, for a first packet of a particular flow, performing a load balancing operation to select a destination machine (either on the same host computer or on a different host computer). The load balancing operation, in some embodiments, preferentially selects local compute nodes to provide the service associated with the VIP in order to reduce redirection, but based on the load balancing algorithm or method can select any compute node executing on any host computer and selects at least one compute node on at least one other host computer for at least one flow. Once the destination machine is selected, the distributed LB instance, in some embodiments, creates a record in the middlebox service record storage to identify the destination IPv4 header values for subsequent packets of the particular flow. For subsequent packets in a flow destined to the LB VIP, the lookup in the middlebox service record storage is based on a set of at least one other IPv4 header values (e.g., source IP, source port, source IP/port, etc.).

Once the internal IPv4 address and port have been identified, the distributed middlebox service replaces (at 550) the external IPv4 address and port with the identified internal IPv4 address and port. The packet is then forwarded (at 560) to the destination machine based on the internal IPv4 address and port. In some embodiments, the packet is forwarded (at 560) through a logical switch that connects the destination machine to the distributed middlebox service instance. For the LB instance, the identified IPv4 destination connected to the logical switch, in some embodiments, is a compute node executing on another host computer that also implements the logical switch (i.e., is within the span of the logical switch). Once the packet is forwarded to the destination machine, the process ends.

Figure 6:
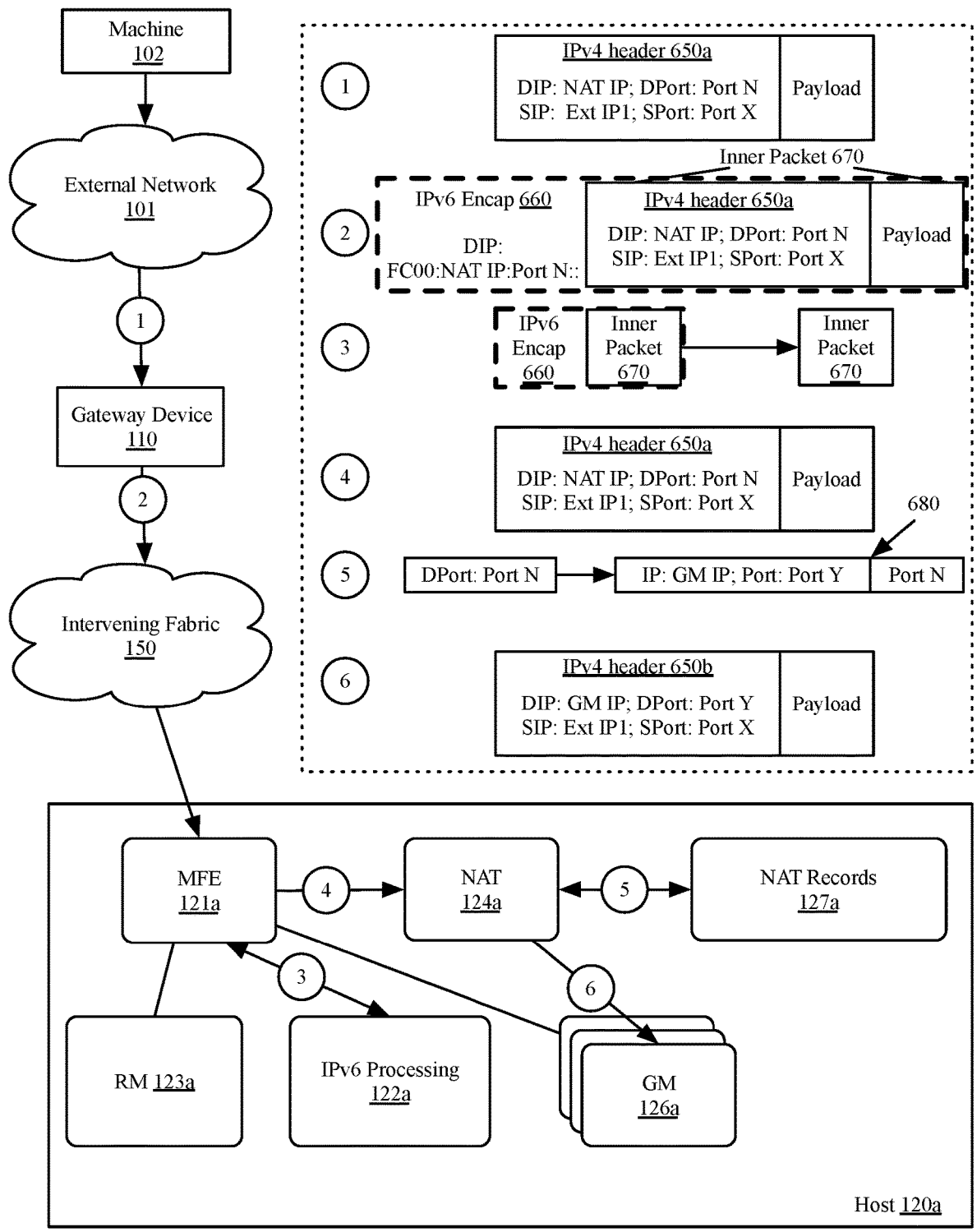
FIG. 6 illustrates a packet being sent from an external machine to a guest machine in an internal network.

FIG. 6 illustrates a packet being sent from an external machine 102 to a guest machine (GM) 126 in an internal network. The original data message is sent with an IP header 650*a* that specifies a destination IP (DIP) address associated with the dSNAT middlebox service and a destination port (Dport) that is within the range assigned to a particular dSNAT middlebox service instance 124*a*. The source IP address (SIP, Ext IP1) and port (Sport, Port Y) are associated with the external machine 102. At the gateway device 110 the IPv4 packet (i.e., inner packet 670) sent by the external machine 102 is encapsulated with an IPv6 header 660 based on the process discussed above in relation to FIGS. 2-3B. The resulting packet has a destination IPv6 address associated with host 120*a* (e.g., FC00:NAT IP:PortN::) and NAT instance 124*a* and is sent to the host 120 through the intervening fabric 150.

The IPv6 encapsulated packet is then received at the managed forwarding element (MFE) 121*a* and is passed to an IPv6 processing module 122*a* to perform IPv6 processing. In other embodiments, IPv6 processing is performed in an IPv6 stack in a dual stack MFE or routing machine 123*a*. The IPv6 processing, in some embodiments, includes removing the IPv6 encapsulation and returning the IPv4 packet to the MFE 121*a*. In other embodiments, the IPv6 processing includes identifying the NAT instance 124*a* based on the IPv6 header values and removing the encapsulation. In embodiments in which the inner packet 670 is returned to the MFE 121*a*, the MFE 121*a* identifies the NAT instance 124*a* as the destination of the inner packet 670 based on the IPv4 header.

The NAT 124*a* instance receives the original (or inner) IPv4 packet and performs a lookup in NAT records storage 127*a*. The NAT records 127*a* includes a record 680 that associates a port number used to replace the source port and the replaced source port and replaced source IPv4 address. In some embodiments, the port number used to replace the source port is also associated with an IP address of the external machine so that a same port number can be reused for connections to different external machines. The lookup, in some embodiments, is based on a destination port of the IPv4 packet. The result of the lookup in the NAT records 127*a* is then provided to the NAT instance 124*a* to be used to replace the destination IPv4 address and port number. The IPv4 packet with the translated address (i.e., having IPv4 header 650*b*) is then forwarded to the destination machine (e.g., GM 126*a*).

Figure 7:
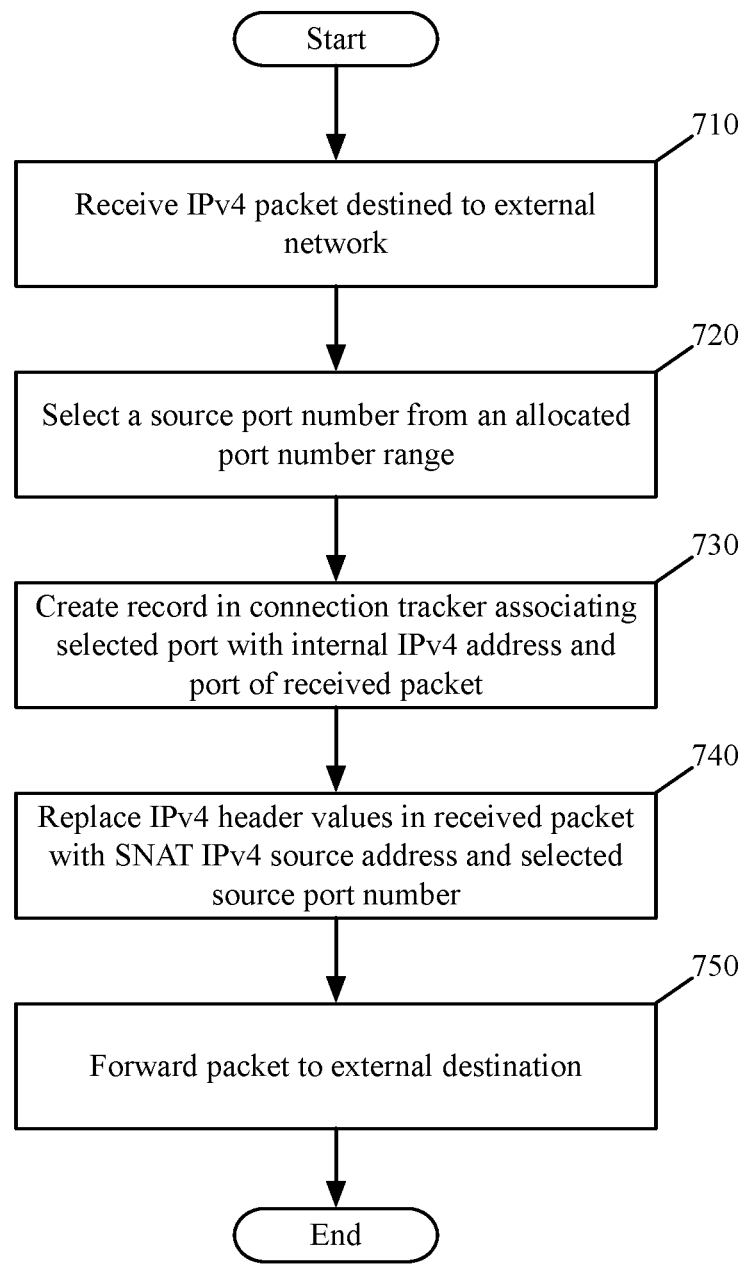
FIG. 7 conceptually illustrates a process performed by a NAT instance processing a first packet in a packet flow destined for a destination machine in an external network.
Figure 8:
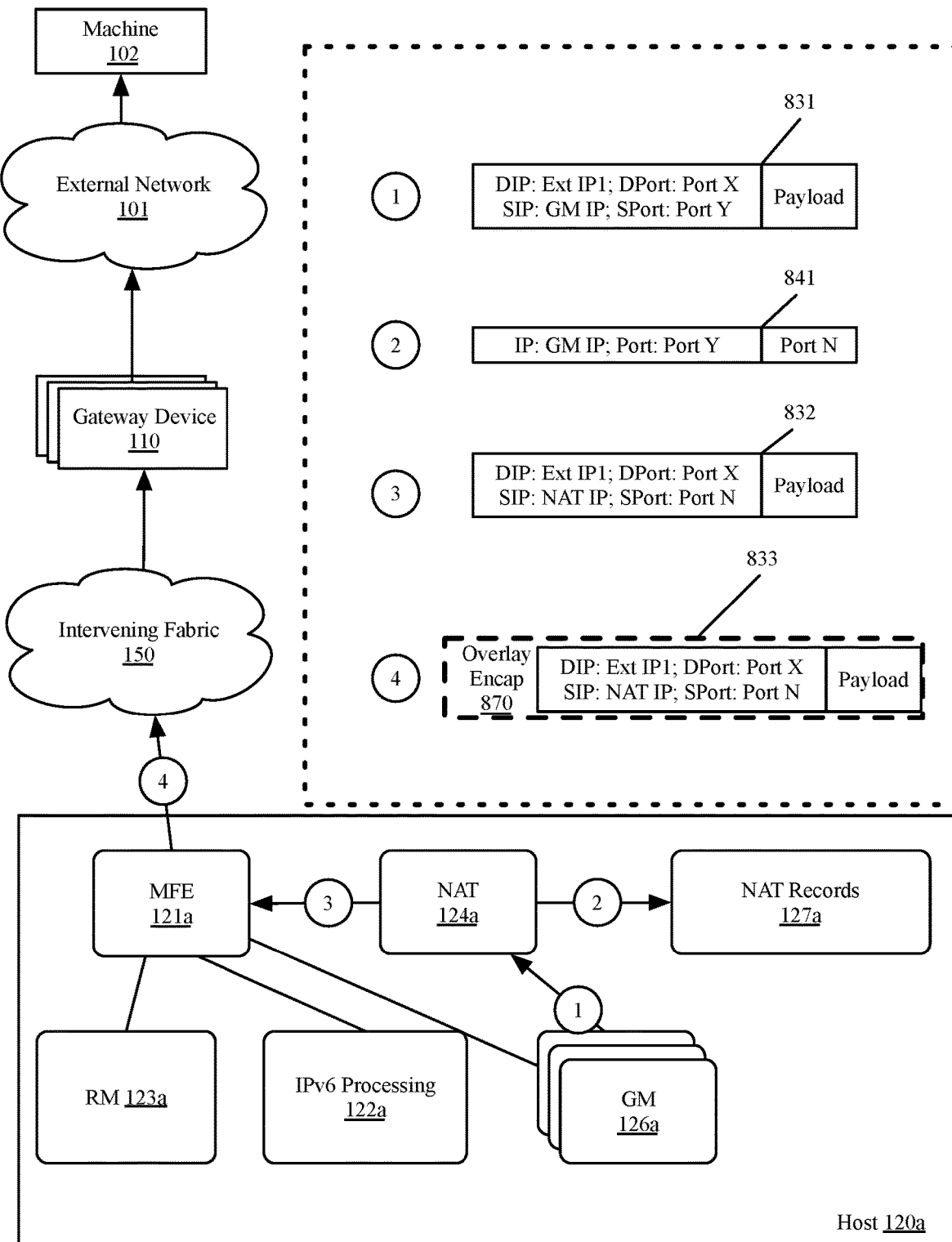
FIG. 8 illustrates a first packet in a packet flow being sent from a GM and processed by the NAT instance executing on the same host computer.

FIG. 7 conceptually illustrates a process 700 performed by a NAT instance (e.g., NAT instance 124*a*) processing a first packet in a packet flow destined for a destination machine 102 in an external network 101. The discussion of FIG. 7 will reference elements of FIG. 8 to provide examples of the operations of FIG. 7. FIG. 8 illustrates a first packet in a packet flow being sent from a GM and processed by the NAT instance executing on the same host computer. The process 700 begins by receiving (at 710) a packet destined to a machine in an external network. The received packet has a source IPv4 address associated with a source machine in an internal network and a source port selected by the source machine. For example, packet 831 received at NAT instance 124*a* from GM 126*a* is destined to an external IP (i.e., Ext IP1) and destination port (i.e., Port X) and has a source IP address of a GM 126*a* (i.e., GM IP) and a source port (i.e., Port Y). In some embodiments, the source port of packet 831 is randomly selected from the entire range of source ports (0-65535).

The process selects (at 720) a source port number (e.g., Port N) from a range of available port numbers allocated to the NAT instance. The available port numbers, in some embodiments, are port numbers in an assigned range of port numbers that have not been selected for a currently-active connection. In some embodiments, the range of port numbers is allocated by a controller computer cluster. The range of port numbers, in some embodiments, is a range of port numbers that share a first set of common bits that are not shared by port numbers allocated to other NAT instances on other host computers. For example, each port number in a range of 1024 port numbers from 0-1023 or 2048-3071 each share a different common set of 6 initial bits in a 16-bit port address. Larger or smaller allocated ranges will have fewer or greater numbers of common bits respectively.

After selecting (at 720) the port number, the process 700 creates (at 730) a connection tracking record (e.g., a NAT record) in a connection tracker (e.g., NAT records 127) that associates the selected port number with the source IP address and source port of the packet for which the port number is selected. In FIG. 8, the NAT record 841 associates the selected port, Port N, with the source IP address, GM IP, and the source port, Port Y, of the received packet 831. In some embodiments, the port number used to replace the source port is also associated with an IP address of the external machine so that a same port number can be reused for connections to different external machines. The connection tracking record is used, as described above, to translate a NAT IP and port number of a packet received from an external network back to the internal IP and port number of the original connection associated with the destination port number of the received packet.

After creating (at 730) the connection tracking record, the process 700 replaces (at 740) the source IP address and source port number with a particular IP address in a set of IP addresses assigned to the distributed NAT service and the selected port number. For simplicity, the examples throughout the description assume that the distributed NAT service is assigned a single external IP address, i.e., NAT IP. One of ordinary skill in the art will appreciate that the methods discussed are applied similarly for multiple IP addresses associated with a distributed NAT service (or any other distributed middlebox service using a set of external IP addresses). For example, packet 831 has its source IP address and port replaced with the NAT IP and selected port number to produce a serviced packet 832 which is then forwarded (at 750) to the destination and the process 700 ends. In some embodiments, forwarding the serviced packet to the destination includes forwarding the serviced packet to an MFE (e.g., MFE 121a) to be forwarded to the external destination.

Packets processed by the middlebox service instance executing on a host computer that are destined for an external network, in some embodiments, are sent from the host without encapsulation in an IPv6 header using the advertised IPv6 address as a source IP address. While the IPv6 address prefix associated with the middlebox service instance is not used in encapsulating the packet, in some embodiments, other encapsulation may be used to reach the gateway device or the external destination machine. In some embodiments, the packets processed by the middlebox service instance are encapsulated in an IPv6 header using an IPv6 source address associated with the middlebox service instance. FIG. 8 illustrates the serviced packet 832 being encapsulated in overlay encapsulation header 870 to be sent over an overlay network (e.g., using an overlay network identifier such as a virtual network identifier (VNI)) to which the GM 126a and NAT instance 124a belong. An MFE or virtual tunnel end point (VTEP), in some embodiments, performs the encapsulation of the serviced packet 832 to produce the encapsulated packet 833.

Figure 9:
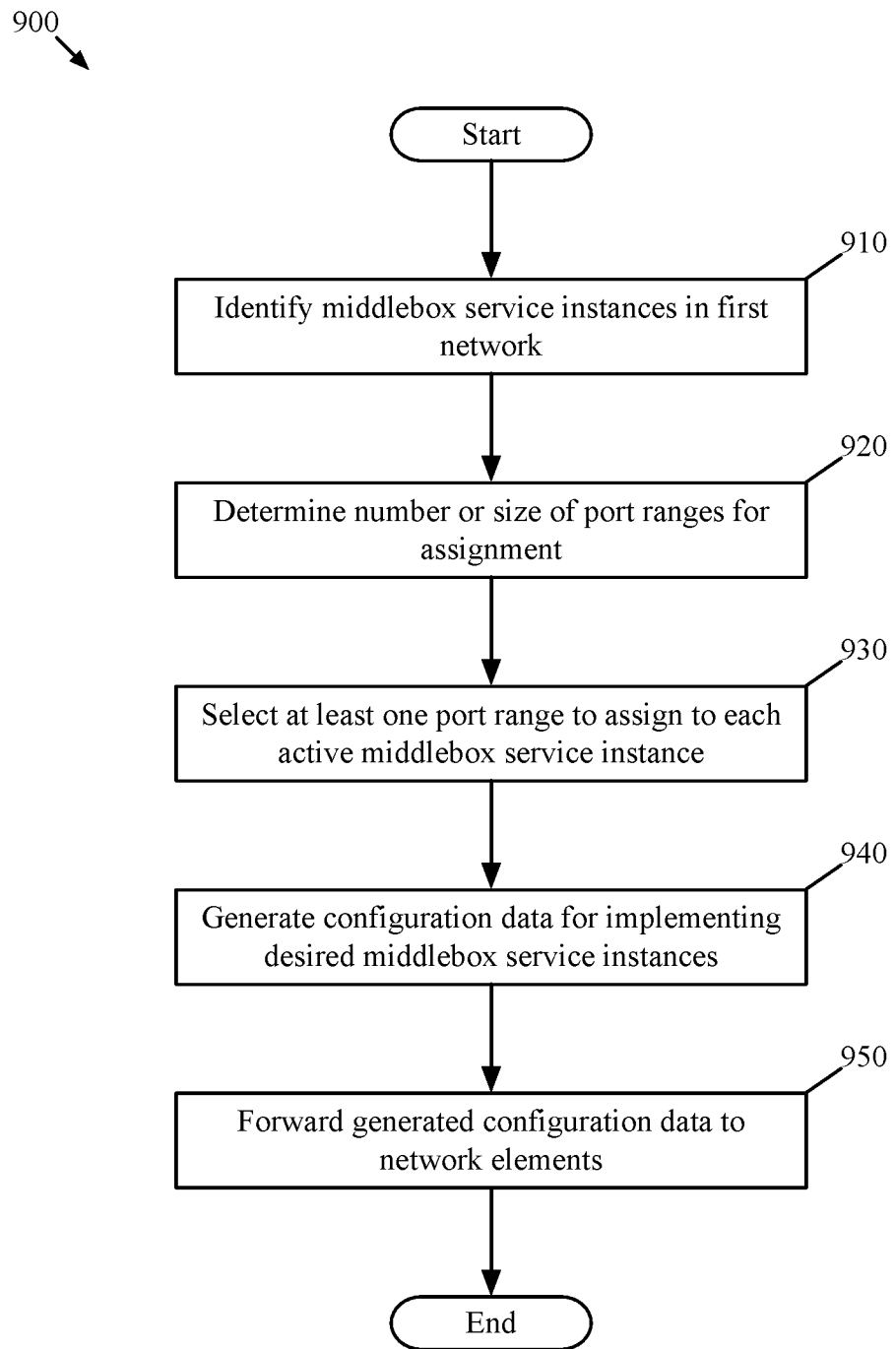
FIG. 9 conceptually illustrates a process for generating configuration data for different network elements that provide the middlebox service and facilitate the provision of the middlebox service.

In some embodiments, a controller computer cluster (i.e., a set of one or more controller computers) of the first network provides configuration information to network elements to facilitate the middlebox service operation for the first network. FIG. 9 conceptually illustrates a process 900 for generating configuration data for different network elements that provide a middlebox service or facilitate the provision of the middlebox service. In some embodiments, process 900 is performed by a controller computer or a controller computer cluster. In some embodiments, the process 900 is performed each time a new middlebox service instance is spun up.

Process 900 begins by identifying (at 910) the middlebox service instances in the first network. In some embodiments, identifying the middlebox service instances includes identifying (1) active middlebox service instances and (2) middlebox service instances that have been requested to be activated (e.g., spun up). Identifying the middlebox service instances, in some embodiments, includes identifying the number of end machines (e.g., workload VMs, containers, etc.) that each middlebox service instance supports (i.e., provides the middlebox service for). In some embodiments, in addition to identifying the number of end machines, identifying the middlebox service instances includes identifying either or both of (1) a total number of connections being handled by the distributed middlebox service (i.e., a sum over all the distributed middlebox instances) and (2) a number of connections being handled by each middlebox service instance.

After identifying (at 910) the middlebox service instances, the process 900 determines (at 920) a number of port ranges or a size of port ranges that will be available for assignment. In some embodiments, the number of port ranges or the size of the port ranges is determined based on input from a user (e.g., an administrator) of the first network or a logical network within the first network. The input from the user may be based on a maximum amount of resources that the user desires a middlebox service instance to consume in providing the middlebox service. The user input, in some embodiments specifies any or all of (1) a maximum number of middlebox service instances that can be instantiated, (2) a maximum number of ports that can be assigned to a single middlebox service instance, or (3) policies for determining the number of ports assigned to particular middlebox service instances. The policies, in some embodiments, are based on any or all of (1) a number of active middlebox service instances, (2) a number of compute nodes for which each active middlebox service instance provides the distributed middlebox service, (3) a number of connections being handled by the distributed middlebox service, and (4) the number of connections being handled by each middlebox service instance.

For example, a policy may specify that a division of the entire range of possible port numbers be divided into a power of two that is at least twice as large as (or as large as) the number of middlebox service instances and that the port number ranges are adjusted based on the policy as the number of middlebox service instances increases or decreases (e.g., going from 4 to 5 middlebox service instances causes each of 8 port ranges to be divided into two smaller port number ranges, or going from 17 to 16 middlebox instances causing 64 port number ranges to be consolidated into 32 port number ranges). The policy, in some embodiments, specifies that each middlebox service instance be assigned non-adjacent port number ranges (e.g., 0-8191 assigned to a first middlebox service instance, 16384-2475 for the second middlebox service instance, etc.). Such a policy allows for increasing and decreasing the number of hosts without having to reassign port number ranges as often.

In some embodiments, the policy may specify that (1) when a particular middlebox service instance uses a fraction of the port numbers assigned to the middlebox service instance above a threshold fraction (e.g., 0.8 or 0.9) an adjacent available range will be assigned, workload compute nodes will be migrated from the host computer on which the middlebox service instance executes, or a new middlebox service instance will be spun up (e.g., activated on another host computer), (2) when a particular middlebox service instance uses a fraction of the port numbers assigned to the middlebox service instance below a threshold fraction (e.g., 0.3 or 0.2) the range of port numbers assigned will be reduced or additional end machines will be migrated to the host computer on which the middlebox service instance executes (e.g., from a host computer executing a middlebox service instance that is using a greater fraction of its assigned port numbers), and (3) when the total number of connections being handled by the middlebox service instances is below a certain threshold fraction of the capacity based on the number of middlebox service instances and assigned port ranges that a middlebox service instance will be deactivated, or smaller port ranges will be assigned to each active middlebox service instance. Other policies may specify assigning port ranges based on a number of workload compute nodes that are provided the middlebox service by the middlebox service instance (e.g., for 0-10 workload compute nodes, 256 port numbers are assigned; for 11-20 workload compute nodes, 512 port numbers are assigned; etc.). One of ordinary skill in the art will understand that these policies are merely examples of possible policies and that different policies are used in different embodiments according to the requirements of the user.

After identifying (at 910) the middlebox service instances and determining (at 920) the port number ranges, the process 900 selects (at 930) at least one port range to assign to each middlebox service instance. As discussed above, an initial port range assignment, in some embodiments, assigns each middlebox service instance a non-adjacent, non-overlapping, port range. Subsequent assignments, in some embodiments, assign at least one additional port number range to particular middlebox service instances that use a number of port numbers above a threshold fraction of the assigned port numbers. Other subsequent assignments, in some embodiments, remove a portion of a range of port numbers from an initial assignment to a particular middlebox service instance that uses less than a threshold number of port numbers in the initially assigned port number range.

The size of the port number ranges assigned to the middlebox service instances, in some embodiments, are fixed by an administrator based on a maximum number of expected middlebox service instances (e.g., for an expected maximum of 64 middlebox service instances, creating 64 different port number ranges each including 1024 ports that are each assigned to a middlebox service instance on startup). In other embodiments, the size of the port number ranges is dynamic and may change based on the number of active middlebox service instances, active connections, or workload compute nodes using the middlebox service. The port number ranges may also vary in size between middlebox service instances. For example, a larger port number range is assigned to a first middlebox service instance executing on a host computer executing a larger number of workload compute nodes using the middlebox service than a second middlebox service instance executing on a host computer executing a smaller number of workload compute nodes using the middlebox service and may change as the number of workload compute nodes changes.

Figure 10:
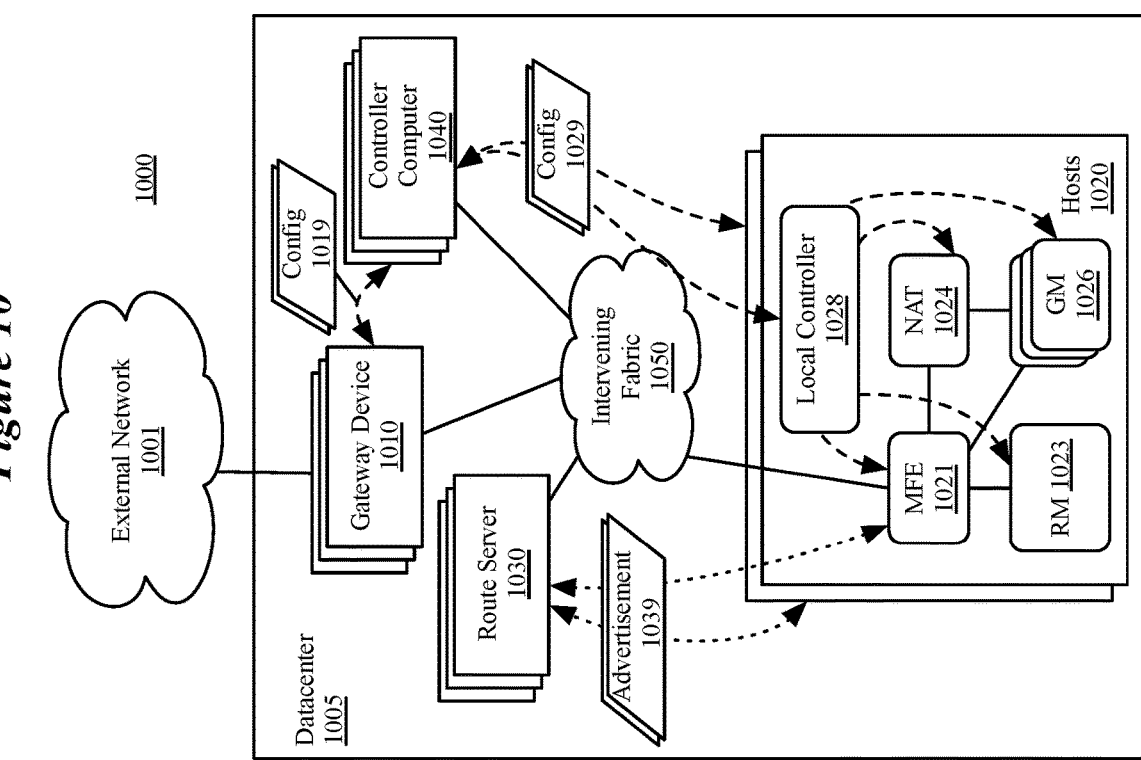
FIG. 10 illustrates a computer controller cluster in a datacenter sending different types of configuration data to different network elements.

After selecting (at 930) the range of port numbers for each middlebox service instance to use, the process 900 generates (at 940) configuration data for implementing the desired middlebox service instances. The configuration data, in some embodiments, includes multiple sets of configuration data for different network elements (e.g., host computers, gateway devices) and for different purposes. FIG. 10 illustrates a computer controller cluster 1040 in a datacenter 1005 sending different types of configuration data to different network elements. The elements of FIG. 10 are generally the same as those discussed in FIG. 1 with the addition of a local controller 1028 that receives configuration data from controller cluster 1040. FIG. 10 illustrates a set of configuration data 1029 for each host computer 1020 (received at local controller 1028). The configuration data 1029, in some embodiments, includes configuration information for (1) configuring the middlebox service instance to provide the middlebox service, (2) configuring other network elements executing on the host computer (e.g., GMs 1026 and MFE 1021) to communicate with the middlebox service instance (e.g., 1024), (3) configuring an MFE or BGP instance executing on a host computer to advertise the IPv6 address associated with a middlebox service instance executing on the host computer. The local controller 1028, in some embodiments, receives the configuration data and identifies the configuration data for each module executing on the host computer 1020 as will be explained in relation to FIG. 12. The controller computer cluster 1040, in some embodiments, also sends configuration data 1019 to the set of gateway devices for configuring a gateway device to perform an IPv4 to IPv6 encapsulation and, in some embodiments, for configuring the gateway device with IPv6 routing table entries.

The configuration data (e.g., configuration data 1029) includes configuration data for configuring at least one middlebox service instance executing on at least one host computer to provide the middlebox service using an assigned range of port numbers. Configuration data for initializing a new middlebox service instance on a host computer includes, in some embodiments, an IPv4 address associated with the middlebox service used in performing the middlebox service operation (e.g., replacing source IP addresses of packets going from the first network to an external network) and an assigned port number range. Additional configuration information (e.g., logical overlay network elements to which the middlebox instance connects) is sent, in some embodiments, to the host computer to configure other elements of the host to communicate with the new middlebox service instance as will be appreciated by one of ordinary skill in the art.

Figure 12:
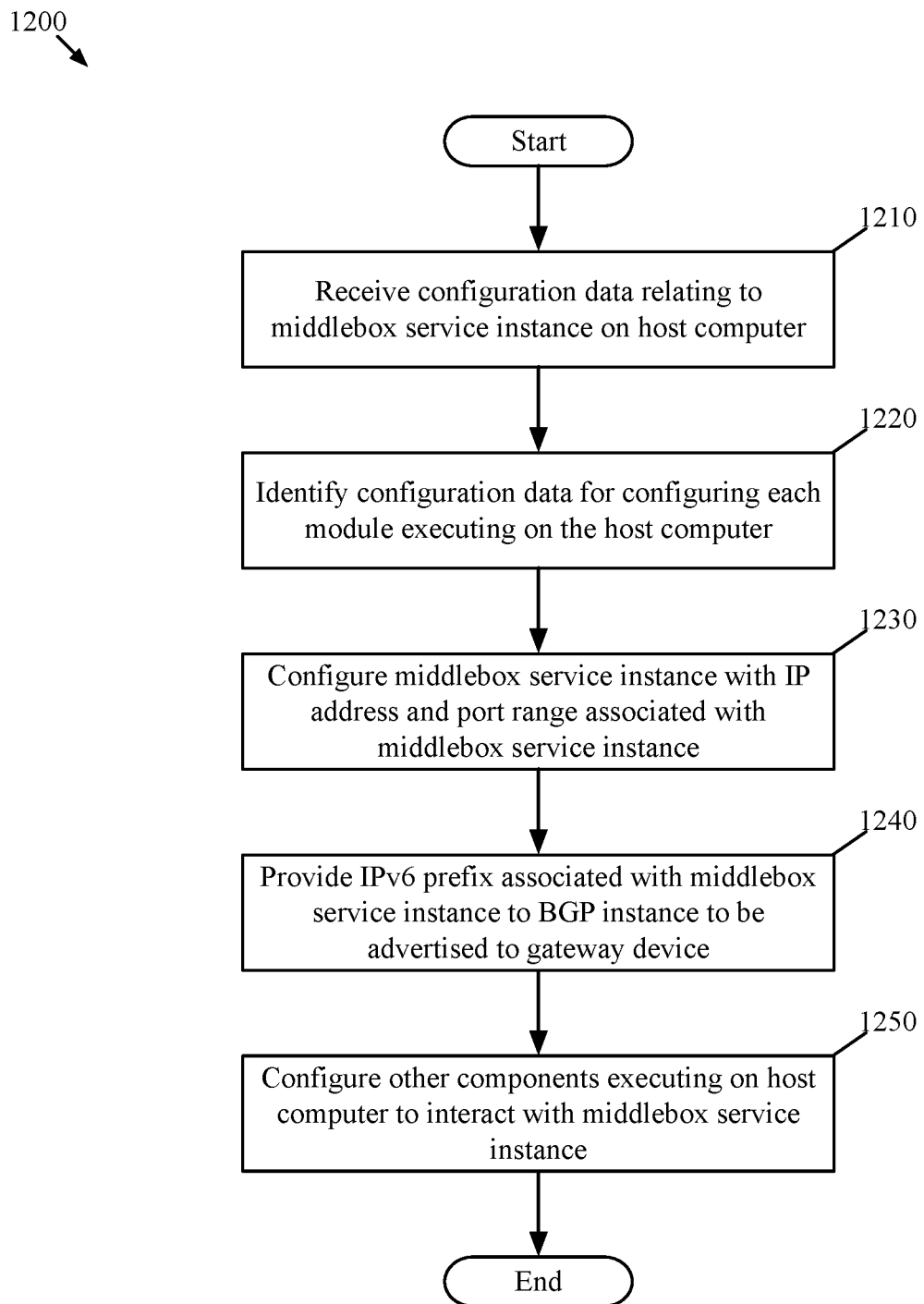
FIG. 12 conceptually illustrates a process for configuring a host computer to execute a distributed middlebox service instance and advertise the IPv6 address prefix associated with the middlebox service instance executing on the host computer.

The additional configuration data sent to the host computer, in some embodiments, includes configuration data sent to the host computer to configure the host computer (or an MFE or BGP instance executing on the host computer) to identify and advertise the IPv6 address prefix associated with the middlebox service instance as described in relation to FIG. 12. As discussed in relation to FIG. 12, the configuration data, in some embodiments, also includes information used internally to the host computer to address the middlebox service instance and configure machines executing on the host computer to use the middlebox service instance for particular packets (e.g., packets destined for external networks).

In some embodiments, the generated configuration data includes configuration data (e.g., configuration data 1019) generated for providing to gateway devices. The gateway devices, in some embodiments, are partially- or fully-programmable gateway devices that can be programmed by the controller computer cluster to implement the IPv4 to IPv6 translation and encapsulation based on PBR rules specified based on IPv4 address and destination port in an IPv4 header. In other embodiments, the gateway devices are off-the shelf-gateway devices (e.g., dual stack routers) that are capable of simple programming sufficient to configure the gateway device to implement the IPv4 to IPv6 encapsulation.

For both programmable and off-the-shelf gateway devices the configuration data includes what will be referred to as a set of middlebox service records and IPv6 routing table entries. The middlebox service records, in some embodiments, map combinations of the IPv4 address used by a particular middlebox service operation and destination port number to an IPv6 destination address. The middlebox service records in some embodiments, are provided as a lookup table and an instruction to use the lookup table to route data messages using the IPv4 address used by a distributed middlebox service. In some embodiments, the middlebox service record is a PBR rule (or similar rule or policy) that defines an algorithm for generating an IPv6 address from an IPv4 destination address and port number. In some embodiments, the PBR rule specifies an IPv4 destination address for which the algorithm should be applied, while in other embodiments, both an IPv4 address and port number are specified. The middlebox service record, in some embodiments, is an instruction to configure an off-the-shelf gateway device to perform IPv6 encapsulation according to a specified algorithm for IPv4 packets destined to the IPv4 used by a particular middlebox service operation. In some embodiments, the instruction is based on a functionality provided by the off-the-shelf gateway device (e.g., an exposed API).

The IPv6 routing table entries, in some embodiments, each identify an IPv6 address prefix associated with a particular host computer in a set of multiple host computers that each execute a middlebox service instance and a next hop interface to use to reach the particular host computer. The IPv6 address prefix specified in the IPv6 routing entry for a particular host computer is based on the IPv4 address associated with the distributed middlebox service and a port number range assigned to the distributed middlebox service instance executing on the host computer. If multiple non-adjacent port ranges are assigned to a particular host computer, the set of IPv6 routing table entries includes multiple entries for the particular host computer.

Figure 11:
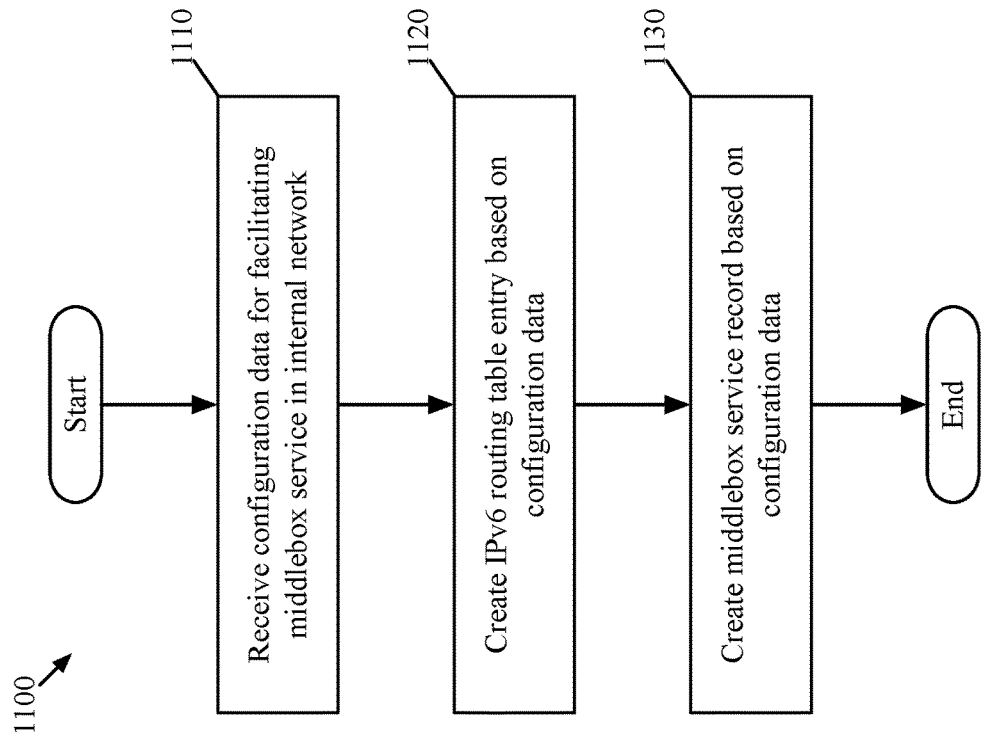
FIG. 11 conceptually illustrates a process performed by a gateway device to facilitate the provision of the middlebox service based on received configuration data.

Once the configuration data is generated (at 940), the configuration data generated for each network element is forwarded (at 950) to the appropriate network element to be used to configure the network element as described in relation to FIGS. 12 and 11. The configuration data, in some embodiments, is received at the host computers by a local controller (e.g., local controller 1028) or a local controller agent that communicates with the controller computer cluster using control plane messages. The local controller then provides the configuration data or configures the elements on the host computer to implement the middlebox service (e.g., instantiate a middlebox service instance, configure GMs to use the middlebox service instance, and configure an MFE to advertise the IPv6 address prefix associated with the middlebox service instance, etc.). The configuration data generated for the gateway device is forwarded to the gateway device to configure the gateway device to identify particular host machines associated with particular received packets (e.g., by using the provided IPv6 routing table entries). After forwarding (at 950) the configuration data, the process ends. One of ordinary skill in the art will understand that, in some embodiments, process 900 is performed for each distributed middlebox service that uses a same IPv4 address as a source address for outgoing packets at each of multiple distributed middlebox service instances.

The controller computer cluster, in some embodiments, monitors the load on the middlebox service instances and the middlebox service in the aggregate periodically or based on a schedule. In some embodiments, the monitoring is based on a program executing on the same host computers as the middlebox service instances. The program, in some embodiments, monitors a set of metrics associated with the middlebox service instance (e.g., latency, number of connections handled, number of packets per second, number of end machines using the middlebox service instance, etc.). In some embodiments, operations 910 and 920 are performed whenever a new middlebox service instance or workload machine is requested to be initialized. The operations 910 and 920 are also performed periodically or based on a schedule set by an administrator, in some embodiments, to determine if the monitoring information indicates that there has been a change requiring reallocation of port number ranges or the size of any port number ranges. If such a change occurs, operations 930-950 are then performed to update the allocation of port ranges and provide updated configuration data to the network elements.

FIG. 11 conceptually illustrates a process 1100 performed by a gateway device to facilitate the provision of the middlebox service based on received configuration data. The process 1100 begins by receiving (at 1110) configuration data for facilitating the provision of the middlebox service in an internal network. As discussed in relation to FIGS. 9 and 12, the configuration data in some embodiments is received from a controller computer cluster (e.g., configuration data 1019) or as an advertisement of the availability of an IPv6 address prefix (e.g., advertisement 1039). In some embodiments, the controller cluster provides a portion of the configuration data while the advertisement includes a different portion of the configuration data. For example, the controller computer, in some embodiments provides configuration data relating to the middlebox service records as described in relation to FIG. 9, while the IPv6 routing table entry configuration data is received from host computers through advertisements of IPv6 address prefixes available at the host computers as described in relation to FIG. 12. In embodiments in which the advertisements made by host computers provide configuration information for routing table entries, as new middlebox service instances come online, the gateway device receives additional configuration information in the form of additional advertisements for the IPv6 address prefixes of the new middlebox service instances.

Based on the configuration data received (at 1110) the gateway device creates (at 1120) at least one IPv6 routing table entry for the received IPv6 address prefixes. In some embodiments, the routing table entries are static entries provided by the controller computer cluster that can be updated by the controller computer cluster as the configuration data changes. In other embodiments, the routing table entries are dynamic routing table entries that are created based on BGP or other route learning protocols known to one of ordinary skill in the art.

The process 1100 also creates (at 1130) middlebox service records based on the configuration data. As discussed in relation to FIGS. 9 and 12, the middlebox service records may be any type of record or rule that identifies packets destined to the IPv4 address associated with the middlebox service as requiring IPv6 encapsulation and enable the gateway device to identify the correct IPv6 destination address to use to reach the middlebox service instance associated with the packet. For example, the middlebox service record, in some embodiments, is any of (1) a PBR rule that identifies packets destined for the IPv4 address associated with the middlebox service as requiring IPv6 encapsulation and specifying the method for producing the IPv6 destination, (2) a set of records for a lookup table that identifies IPv6 destination addresses for a set of combinations of IPv4 address and destination port, or (3) an API instruction for an API exposed by an off-the-shelf gateway device to enable the programmatic encapsulation of the IPv4 packets destined for the IPv4 address associated with the middlebox service into an IPv6 packet. One of ordinary skill in the art will appreciate that the creation of the routing table entries (at 1120) and middlebox service records (at 1130) may be performed simultaneously or in the opposite order from that described in process 1100. Once the routing table entries and middlebox service records have been created the process ends. However, one of ordinary skill in the art will appreciate that process 1100, or a portion thereof, is performed each time new configuration data is received at the gateway device. For example, each advertisement of a new IPv6 address prefix by a host computer will lead to the creation of a new IPv6 routing table entry in the gateway device.

The host computer, in some embodiments, is configured to advertise the availability of an IPv6 address prefix that is based on the IPv4 used by the middlebox service instance as a source address for packets going from the first network to external networks and the range of port numbers assigned to the middlebox service instance. FIG. 12 conceptually illustrates a process 1200 for configuring a host computer to execute a distributed middlebox service instance and advertise the IPv6 address prefix associated with the middlebox service instance executing on the host computer. The process 1200, in some embodiments, is performed by a host computer (e.g., host computer 1020) executing a local controller (e.g., local controller 1028) and a BGP instance (e.g. either MFE 1021 or routing machine 1023).

Process 1200 begins by receiving (at 1210) configuration information relating to a middlebox service instance executing on the host computer. The configuration information relating to the middlebox service instance, in some embodiments, includes (1) the IPv4 address used by the middlebox service to replace the source address of packets sent from within the first network to machines in external networks and (2) the range of port addresses assigned to the middlebox service instance executing on the host computer. In other embodiments, the configuration information also includes information used internally to route packets to the middlebox service instance such as IP and MAC addresses or next hop interfaces used to forward packets to the middlebox service instance. An IPv6 address associated with the middlebox service instance is also included in the configuration information, in some embodiments. The configuration information, in some embodiments, is received from a controller computer in a controller computer cluster that configures the elements of the first network.

After receiving (at 1210) the configuration information, the process 1200 identifies (at 1220) configuration data for configuring different components (e.g., machines, MFEs, filters, containers, pods, etc.) executing on the host computer. For example, the middlebox service instance requires configuration data including the external IP address associated with the middlebox service, a range of ports assigned to the middlebox service instance and, in some embodiments, IP and media access control (MAC) addresses associated with the middlebox service instance. A BGP instance (e.g., MFE 1021 or routing machine 1023), in some embodiments, requires knowledge of the IP address associated with the middlebox service and a port range assigned to the middlebox service instance. In other embodiments, the BGP instance is provided with the IPv6 address prefix to advertise. Other network elements need to be configured with information used to interact with the middlebox service instance such as policies for identifying packets requiring the middlebox service, a MAC address associated with the middlebox service instance and other information that will be apparent to one of ordinary skill in the art.

After the configuration data for each component the process 1200 configures (at 1230) the middlebox service instance with the IP address and port range associated with the middlebox service instance. If the middlebox service instance is being configured for a first time (i.e., is being instantiated) the configuration data includes additional information such as IP and MAC addresses associated with the middlebox service instance. In some embodiments, the configuration data only includes the IP address associated with the middlebox service when a middlebox service instance is instantiated and subsequent updates include only an updated port range.

After configuring (at 1230) the middlebox service instance, the process 1200 provides (at 1240), to a BGP instance executing on the host computer, an IPv6 address prefix identified as being associated with a middlebox service instance based on the configuration information. The identified IPv6 address prefix, in some embodiments, is based on the IPv4 address used by the middlebox service included in the configuration information, and the range of port numbers assigned to the middlebox service instance. The assigned range of port numbers, in some embodiments, is a range of port numbers that share a common set of leftmost bits. For example, assigned ranges of 1024 port numbers are numbers that share the 6 leftmost bits of the port number in common, while assigned ranges of 512 port numbers are numbers that share the 7 leftmost bits in common. The IPv6 address prefix associated with the middlebox service instance in such embodiments, is then identified as an IPv6 address prefix with the rightmost significant bits being the common set of bits in the port numbers assigned to the middlebox service instance. In some embodiments, the advertised IPv6 address is based on existing functions of a hardware gateway device for handling IPv6 encapsulation of IPv4 packets.

Figure 13:
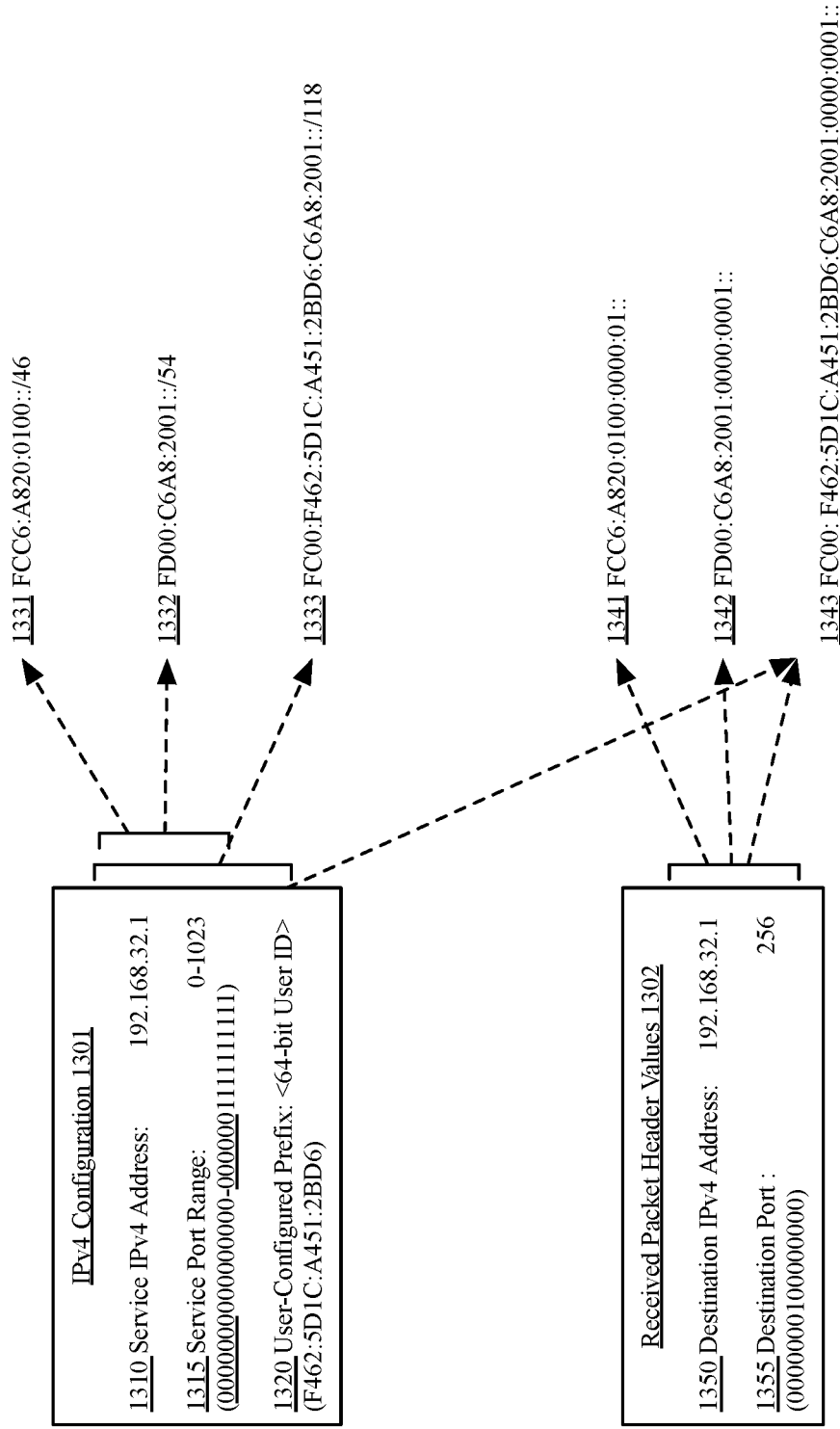
FIG. 13 illustrates three different exemplary advertised IPv6 address prefixes that are used in different embodiments to advertise the availability of the service at the host computer and corresponding exemplary destination IPv6 addresses generated by a gateway device to use in an IPv6 encapsulation header to forward a packet to the particular service instance executing on the host computer making the advertisement.

FIG. 13 illustrates three different exemplary advertised IPv6 address prefixes 1331-1333 that are used in different embodiments to advertise the availability of the service at the host computer and corresponding exemplary addresses 1341-1343 generated by a gateway device to use in an IPv6 encapsulation header to forward a packet to the particular service instance executing on the host computer making the advertisement. FIG. 13 illustrates a set of identified IPv6 address prefixes 1331-1333 that are in the FC00::/8 address block based on a configuration of a middlebox service instance. Other IPv6 prefixes are used, in some embodiments, for other address blocks such as the FD00::/8 address block. The illustrated IPv6 includes the IPv4 address 1310 used by the middlebox service and the common bits (i.e., in the illustrated example the first 6 bits) of the range of port numbers 1315. The illustrated example is for a middlebox service using an IPv4 address 1310 of 192.168.32.1 (or, in hexadecimal, C6A8:2001) and a port range 1315 of 0-1023 (with 6 "0" bits in common). The example also illustrates a user-configured prefix 1320 (e.g., F462:5D1C:A451:2BD6) that, in some embodiments, is used to distinguish packets received for different tenants or logical network implemented in the same datacenter. In some embodiments, the user-configured 64-bit prefix is randomly generated such that common prefixes generated for different tenants are highly unlikely to be the same.

Exemplary IPv6 prefix 1331 is generated using the first 8 bits of the FC00::/8 prefix followed by the 32 bits of the service IPv4 address 1310 and finally the port range prefix common to all the port numbers in the port range 1315 (i.e., FCC6:A820:0100::/46). Similarly, IPv6 prefix 1332 is generated using the first 16 bits of the FD00::/8 prefix followed by the 32 bits of the service IPv4 address 1310 and finally the port range prefix common to all the port numbers in the port range 1315 (i.e., FD00:C6A8:2001::/54). Alternatively, the IPv6 prefix 1333 is generated using the first 16 bits of the FC00::/8 prefix followed by the user-configured 64-bit prefix 1320 followed by the 32 bits of the service IPv4 address 1310 and finally the port range prefix common to all the port numbers in the port range 1315 (i.e., FC00:<user-configured 64-bit prefix>:C6A8:2001::/118).

FIG. 13 shows IPv6 destination addresses 1341-1343 for an exemplary received packet having header values 1302 corresponding to advertised IPv6 prefixes 1331-1333. Exemplary IPv6 destination address 1341 is generated by a gateway device using the first 8 bits of the FC00::/8 prefix followed by the 32 bits of the destination IPv4 address 1350 and finally the destination port number 1355 (i.e., FCC6: A820:0100:0000:01::). Similarly, IPv6 destination address 1342 is generated using the first 16 bits of the FD00::/8 prefix followed by the 32 bits of the destination IPv4 address 1350 and finally the destination port number 1355 (i.e., FD00:C6A8:2001:0000:0001::). Alternatively, the IPv6 destination address 1343 is generated using the first 16 bits of the FC00::/8 prefix followed by the user-configured 64-bit prefix 1320 followed by the 32 bits of the destination IPv4 address 1350 and finally the destination port number 1355 (i.e., FC00:F462:5D1C:A451:2BD6:C6A8:2001::01:0000: 0000).

The BGP instance then advertises the provided IPv6 address prefix associated with the middlebox service instance to a gateway device as being available at the host computer. The advertisement, in some embodiments, includes an instruction to the gateway device to identify the IPv6 address based on an IPv4 address and port number of packets received at the gateway device and encapsulate the IPv4 packets with the identified IPv6 address. In other embodiments, the advertised IPv6 address is (1) based on existing functions of a hardware gateway device for handling IPv6 encapsulation of IPv4 packets, or (2) based on a central controller cluster separately configuring the gateway device to perform the IPv6 encapsulation based on the IPv4 address and port number. In these other embodiments, no special configuration instruction is required from the BGP instance. In some embodiments, the advertisement uses a border gateway protocol (BGP). In other embodiments, other proprietary or non-proprietary (IS-IS, OSPF, FRR etc.) route advertisement protocols or methods are used that inform other routers of the availability of particular network addresses at the host computer. The advertisement, in some embodiments, is made to a route server (or route reflector) that identifies the advertised IPv6 address as being available at the host computer to the gateway device as well as other forwarding elements of the internal network.

The route server, in some embodiments, also uses a BGP advertisement to identify the advertised IPv6 address as being available at the host computer and is used to simplify the exchange of routing information in the network by minimizing the number of peerings between different network elements necessary to propagate routing information in a full mesh configuration. However, one of ordinary skill in the art will appreciate that other methods of advertising the availability of IP addresses may be used. One of ordinary skill in the art will appreciate that the description of BGP instances and BGP protocols is merely one example or a protocol for advertising routing information and is used here merely as an example.

Process 1200 then continues to configure (at 1250) the other components (e.g., machines, MFEs, filters, containers, pods, etc.) executing on the host computer based on the received configuration data. The other components, in some embodiments, are configured to direct traffic to the middlebox service instance based on policies included in the configuration data identifying traffic destined for an external network. One of ordinary skill in the art will understand that the order of configuring the components presented above is not the only possible order and that, in other embodiments, components are configured in parallel (e.g., simultaneously) or in a different order than the order presented above.

Figure 14:
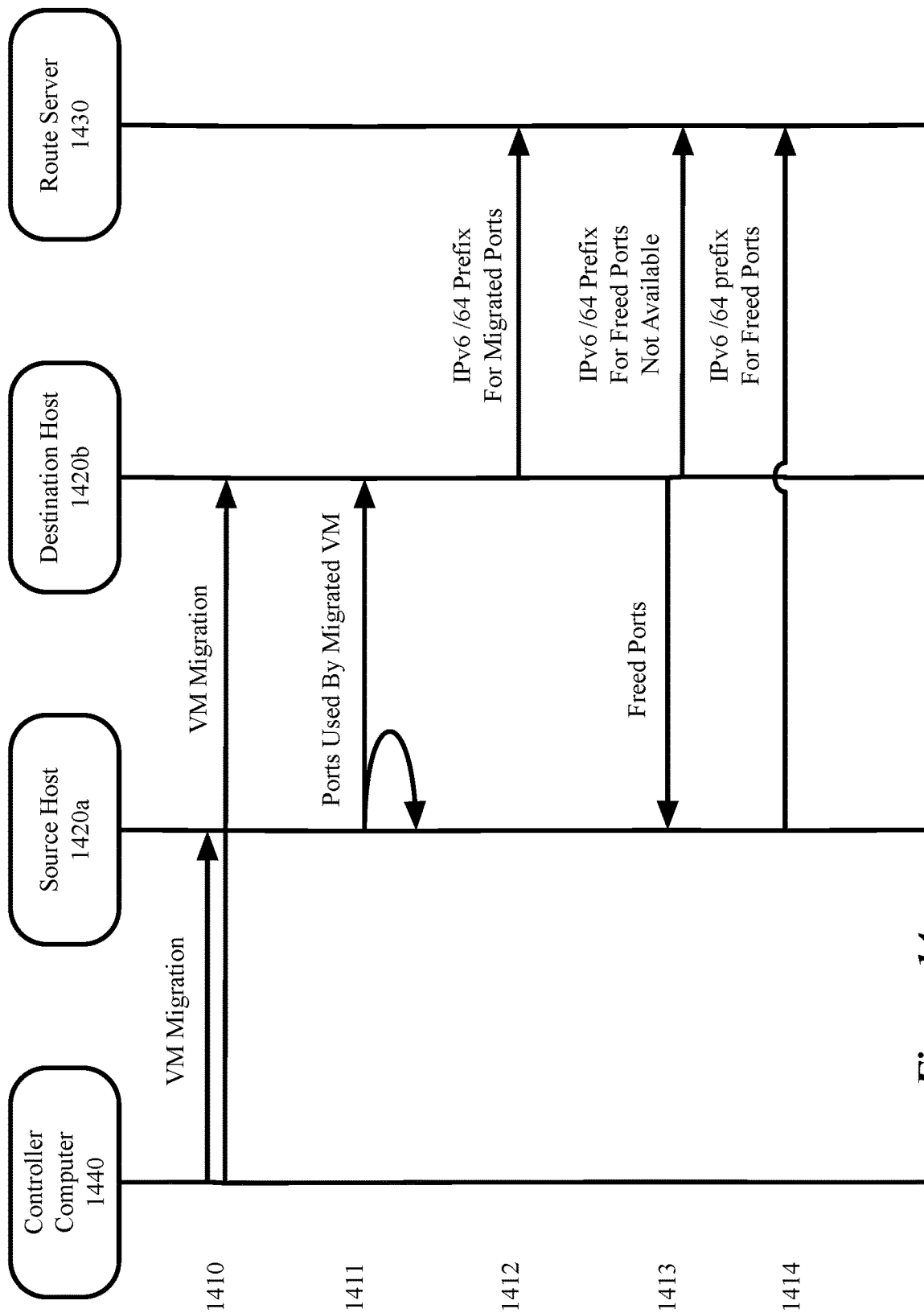
FIG. 14 conceptually illustrates a set of data exchanges between network elements to migrate a compute node.

FIG. 14 conceptually illustrates a set of data exchanges between network elements to migrate a VM (e.g., a guest virtual machine (GVM)) in communication with an external machine using a dSNAT middlebox service. FIG. 14 illustrates a controller computer 1440 that initiates the VM migration, a source host computer 1420a on which the VM originally executes, a destination host computer 1420b to which the VM is migrated, and a route server 1430 that is used by host computers as a central BGP server to disseminate routing information (e.g., IP address prefixes available at each host computer). The data exchange begins (at 1410) with the controller computer initiating a VM migration by sending configuration data to each of the source host computer 1420a and the destination host computer 1420b to identify the VM being migrated.

The source host computer then identifies (at 1411) a set of ports for a set of middlebox services used by active connections of the migrated VM to inform the destination host computer 1420b of the migrated ports. The set of ports identified to the destination host computer 1420b includes NAT records associating the identified ports with the internal IPv4 address and port used by the migrated VM. In some embodiments, the identified ports are put in a list of ports at the source host computer 1420a not to use until they are freed by the migrated VM (e.g., when the active connections using the identified ports end). The source host computer 1420a, in some embodiments, also adds the port numbers to a redirection table to redirect any packets received for that port number to the destination host computer 1420b. In some embodiments in which port numbers are reused for different source and destination IP address pairs, the redirection instruction specifies the specific communications destined to the migrated VM instead of redirecting all packets using a specific port number.

Based on the identified port numbers, the destination host computer, in some embodiments, advertises (at 1412) a set of IPv6 address for the specific migrated port numbers (e.g., an IP address prefix that is FC00:IPv4 address:port::/64) that will be the longest matching prefix at the gateway device and supersede the existing prefix (e.g., a /54 prefix) originally advertised by the source host computer 1420a without requiring further advertisement by the source host computer 1420a. One of ordinary skill in the art will appreciate that in some embodiments in which the same port number is reused for different source and destination IP address pairs, the host computer to which the VM is migrated will not make the advertisement and will instead rely on the redirection at the host computer from which the VM was migrated. As each migrated port is "freed" (i.e., the active connection using that port number ends) the destination host computer 1420b informs (at 1413) the source host computer 1420a that the port has been freed and can be used by the source host computer 1420*a* for new connections. The source host computer, in some embodiments, then removes the freed port from the list of ports not to use.

The destination host computer, in some embodiments, also advertises (at 1413) that the specific IPv6 address prefix (e.g., the /64 prefix) is no longer available at the destination host computer 1420*b*. In some embodiments, the source host computer 1420*a* additionally advertises (at 1414) that the specific IPv6 address prefix (e.g., the /64 prefix) is available at the source host computer 1420*a*. One of ordinary skill in the art will appreciate that, in embodiments in which the same port number is reused for different source and destination IP address pairs, since the host computer to which the VM was migrated does not make an advertisement of the IPv6 address the subsequent advertisements described (at 1413 and 1414) are not necessary. In some embodiments, the source host computer 1420*a* omits advertising the IPv6/64 address prefix associated with the freed port (at 1414) and relies on the IPv6 address prefix (e.g., a /54 prefix associated with the assigned range of port numbers) covering the specific IPv6 address to direct packets to the source host computer 1420*a* once the IPv6/64 address is withdrawn by the destination host computer 1420*b*. Destination host computer 1420*b*, in some embodiments sends information and advertises the unavailability related to a freed port for each freed port as a connection using the port ends. One of ordinary skill in the art will understand that VM migration was used as an example but the above set of data exchanges could be used to migrate any similar compute node (e.g., container, pod, etc.).

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 15:
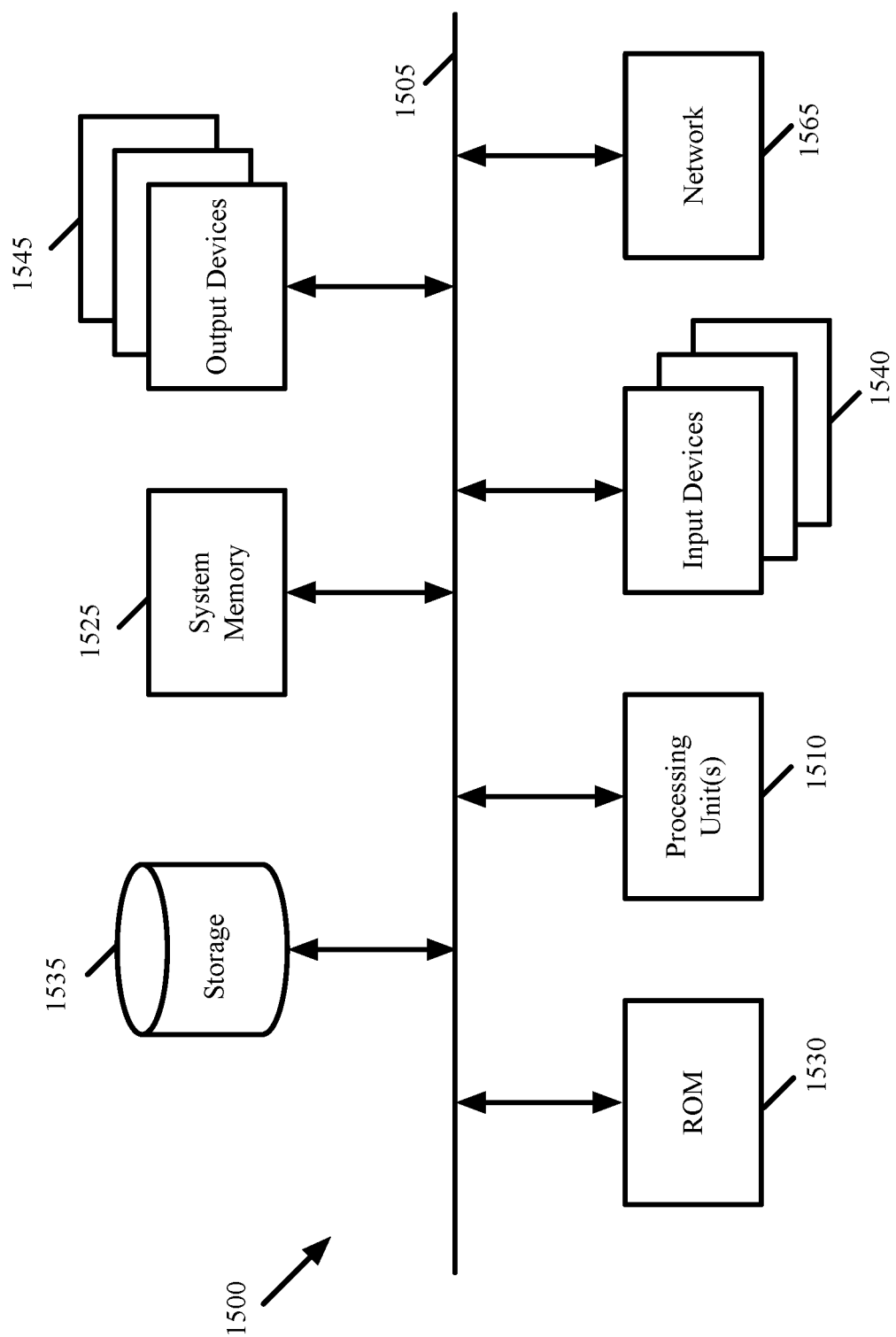
FIG. 15 conceptually illustrates a computer system with which some embodiments of the invention are implemented.

FIG. 15 conceptually illustrates a computer system 1500 with which some embodiments of the invention are implemented. The computer system 1500 can be used to implement any of the above-described hosts, controllers, and managers. As such, it can be used to execute any of the above described processes. This computer system includes various types of non-transitory machine readable media and interfaces for various other types of machine readable media. Computer system 1500 includes a bus 1505, processing unit(s) 1510, a system memory 1525, a read-only memory 1530, a permanent storage device 1535, input devices 1540, and output devices 1545.

The bus 1505 collectively represents all system, peripheral, and chipset buses that communicatively connect the numerous internal devices of the computer system 1500. For instance, the bus 1505 communicatively connects the processing unit(s) 1510 with the read-only memory 1530, the system memory 1525, and the permanent storage device 1535.

From these various memory units, the processing unit(s) 1510 retrieve instructions to execute and data to process in order to execute the processes of the invention. The processing unit(s) may be a single processor or a multi-core processor in different embodiments. The read-only-memory (ROM) 1530 stores static data and instructions that are needed by the processing unit(s) 1510 and other modules of the computer system. The permanent storage device 1535, on the other hand, is a read-and-write memory device. This device is a non-volatile memory unit that stores instructions and data even when the computer system 1500 is off. Some embodiments of the invention use a mass-storage device (such as a magnetic or optical disk and its corresponding disk drive) as the permanent storage device 1535.

Other embodiments use a removable storage device (such as a floppy disk, flash drive, etc.) as the permanent storage device. Like the permanent storage device 1535, the system memory 1525 is a read-and-write memory device. However, unlike storage device 1535, the system memory is a volatile read-and-write memory, such a random access memory. The system memory stores some of the instructions and data that the processor needs at runtime. In some embodiments, the invention's processes are stored in the system memory 1525, the permanent storage device 1535, and/or the read-only memory 1530. From these various memory units, the processing unit(s) 1510 retrieve instructions to execute and data to process in order to execute the processes of some embodiments.

The bus 1505 also connects to the input and output devices 1540 and 1545. The input devices enable the user to communicate information and select commands to the computer system. The input devices 1540 include alphanumeric keyboards and pointing devices (also called "cursor control devices"). The output devices 1545 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 15, bus 1505 also couples computer system 1500 to a network 1565 through a network adapter (not shown). In this manner, the computer can be a part of a network of computers (such as a local area network ("LAN"), a wide area network ("WAN"), or an Intranet, or a network of networks, such as the Internet. Any or all components of computer system 1500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, several figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method of facilitating a network address translation (NAT) operation in a first network of a first datacenter that comprises a plurality of host computers each of which executes a set of one or more machines, the method comprising:
at a router of the first network:
receiving advertisement of different external network addresses that different host computers use to send data messages from the machines that they execute to at least one external second network separate from the first network;
identifying, for each received flow that has a header storing a destination network address that is a particular advertised external network address, an internal network address associated with a host computer that used the particular advertised external network address, using a cache storing information regarding forwarding decisions made for previously received packets and NAT records;
collecting performance metrics associated with the NAT operations;
storing the performance metrics in a time-series database for access by a controller;
accessing the performance metrics from the time-series database to generate aggregated metrics related to the NAT operations;
encapsulating packets of each received flow with an encapsulating header that uses the identified internal network address as a destination address;
forwarding the encapsulated packets along the first network for NAT instances executing on the host computers to decapsulate.

2. The method of claim 1, wherein receiving the advertisements comprises receiving the advertisements from a set of one or more route reflectors within the first network.

3. The method of claim 2, wherein the route reflector set receives the advertisements from routing modules executing on the host computers.

4. The method of claim 1, wherein the internal and external network addresses are layers 3 and 4 network addresses.

5. The method of claim 4, wherein the layer 3 external network addresses are internet protocol version 4 (IPv4) addresses, while the layer 3 internal network addresses are internet protocol version 6 (IPv6) addresses.

6. The method of claim 3, wherein the advertisements comprise advertised IPv6 addresses each of which is an IPv6 address prefix based on an external IPv4 address used by NAT instances on host computers to replace source addresses of packets sent from within the first network to the external second network.

7. The method of claim 1, wherein said identifying is based on a routing entry in a routing table of the router that is created based on the received advertisements.

8. The method of claim 1, wherein the NAT instances on the host computers implement a distributed NAT operation, and each NAT instance is assigned a non-overlapping range of IP and port addresses to perform its NAT operation.

9. The method of claim 1, wherein said identifying comprises using a NAT record that identifies packets received at a gateway that use the advertised external network addresses as destination addresses, as requiring the encapsulating operations to forward the packet using the identified internal network address.

10. The method of claim 9, wherein the NAT record is received from a controller computer of the first network.

11. A non-transitory machine readable medium storing a program which when executed by at least one processing unit facilitates a network address translation (NAT) operation in a first network of a first datacenter that comprises a plurality of host computers each of which executes a set of one or more machines, the program comprising sets of instructions for:
at a router of the first network:
receiving advertisement of different external network addresses that different host computers use to send data messages from the machines that they execute to at least one external second network separate from the first network;
identifying, for each received flow that has a header storing a destination network address that is a particular advertised external network address, an internal network address associated with a host computer that used the particular advertised external network address, using a cache storing information regarding forwarding decisions made for previously received packets and NAT records;

collecting performance metrics associated with the NAT operations;

storing the performance metrics in a time-series database for access by a controller;

accessing the performance metrics from the time-series database to generate aggregated metrics related to the NAT operations;

encapsulating packets of each received flow with an encapsulating header that uses the identified internal network address as a destination address;

forwarding the encapsulated packets along the first network for NAT instances executing on the host computers to decapsulate, to translate the destination addresses in the packet headers from the external network addresses to internal network addresses used by the machines, and to use the translated destination addresses to forward the packets to machines on the host computers.

12. The non-transitory machine readable medium of claim 11, wherein the set of instructions for receiving the advertisements comprises a set of instructions for receiving the advertisements from a set of one or more route reflectors within the first network.

13. The non-transitory machine readable medium of claim 12, wherein the route reflector set receives the advertisements from routing modules executing on the host computers.

14. The non-transitory machine readable medium of claim 11, wherein the internal and external network addresses are layers 3 and 4 network addresses.

15. The non-transitory machine readable medium of claim 14, wherein the layer 3 external network addresses are internet protocol version 4 (IPv4) addresses, while the layer 3 internal network addresses are internet protocol version 6 (IPv6) addresses.

16. The non-transitory machine readable medium of claim 13, wherein the advertisements comprise advertised IPv6 addresses each of which is an IPv6 address prefix based on an external IPv4 address used by NAT instances on host computers to replace source addresses of packets sent from within the first network to the external second network.

17. The non-transitory machine readable medium of claim 11, wherein the set of instructions for said identifying is based on a routing entry in a routing table of the router that is created based on the received advertisements.

18. The non-transitory machine readable medium of claim 11, wherein the NAT instances on the host computers implement a distributed NAT operation, and each NAT instance is assigned a non-overlapping range of IP and port addresses to perform its NAT operation.

19. The non-transitory machine readable medium of claim 11, wherein the set of instructions for said identifying comprises a set of instructions for using a NAT record that identifies packets received at a gateway that use the advertised external network addresses as destination addresses, as requiring the encapsulating operations to forward the packet using the identified internal network address.

20. The non-transitory machine readable medium of claim 19, wherein the NAT record is received from a controller computer of the first network.

* * * * *